(12) United States Patent
Hori et al.

(10) Patent No.: US 6,898,708 B2
(45) Date of Patent: May 24, 2005

(54) DEVICE FOR REPRODUCING DATA

(75) Inventors: Yoshihiro Hori, Gifu (JP); Toshiaki Hioki, Ogaki (JP); Miwa Kanamori, Ogaki (JP); Takatoshi Yoshikawa, Ogaki (JP); Hiroshi Takemura, Aichi (JP); Takayuki Hasebe, Kawasaki (JP); Takahisa Hatakeyama, Kawasaki (JP); Tadaaki Tonegawa, Kodaira (JP); Takeaki Anazawa, Tokyo (JP)

(73) Assignees: Sanyo Electric Co., Ltd., Moriguchi (JP); Fujitsu Limited, Kawasaki (JP)

( * ) Notice: Subject to any disclaimer, the term of this patent is extended or adjusted under 35 U.S.C. 154(b) by 484 days.

(21) Appl. No.: 10/148,191
(22) PCT Filed: Dec. 6, 2000
(86) PCT No.: PCT/JP00/08615
§ 371 (c)(1),
(2), (4) Date: Jun. 6, 2002
(87) PCT Pub. No.: WO01/43339
PCT Pub. Date: Jun. 14, 2001

(65) Prior Publication Data
US 2002/0183985 A1 Dec. 5, 2002

(30) Foreign Application Priority Data
Dec. 7, 1999 (JP) ........................................... 11-347904

(51) Int. Cl.[7] ............................................... H04L 9/00
(52) U.S. Cl. ......................................... 713/171; 705/59
(58) Field of Search .............. 705/51, 59; 380/286.203; 713/166, 170, 171

(56) References Cited

U.S. PATENT DOCUMENTS

| | | | | |
|---|---|---|---|---|
| 5,557,765 A | * | 9/1996 | Lipner et al. | 380/286 |
| 5,745,573 A | * | 4/1998 | Lipner et al. | 380/286 |
| 5,956,403 A | * | 9/1999 | Lipner et al. | 380/286 |
| 5,991,406 A | * | 11/1999 | Lipner et al. | 380/286 |
| 6,256,391 B1 | * | 7/2001 | Ishiguro et al. | 380/203 |
| 6,360,320 B1 | * | 3/2002 | Ishiguro et al. | 713/164 |
| 6,683,956 B1 | * | 1/2004 | Aikawa et al. | 380/37 |
| 6,697,945 B2 | * | 2/2004 | Ishiguro et al. | 713/171 |

FOREIGN PATENT DOCUMENTS

| | | | | |
|---|---|---|---|---|
| EP | 000966127 A1 | * | 12/1999 | H04L/9/32 |
| EP | 001150196 A2 | * | 10/2001 | G06F/1/00 |
| JP | 5-75598 | | 3/1993 | |
| JP | 10-40172 | | 2/1998 | |
| JP | 11-154944 | | 6/1999 | |
| JP | 11-265317 | | 9/1999 | |
| JP | 11-306673 | | 11/1999 | |

OTHER PUBLICATIONS

"A Taxonomy for key escrow encryption systems", Denning et al, Communications of the ACM, v39n3, pp. 34–39(Mar. 1996).*

(Continued)

Primary Examiner—Salvatore Cangialosi
(74) Attorney, Agent, or Firm—Westerman, Hattori, Daniels & Adrian, LLP

(57) ABSTRACT

A cellular phone (100) stores encrypted content data and encrypted license key distributed thereto in a memory card (110). The cellular phone (100) and the memory card (110) collectively perform a part of mutual authentication processing upon power-on. The encrypted license key (Kc) read from the memory card (110) is decrypted by a first decryption processing portion (1510) with a session key (Ks4), and is further decrypted by a second decryption processing portion (1514) with a system symmetric key (Kcom) for extraction. A third encryption processing portion (1516) decrypts the encrypted content data read from memory card (110) with the license key (Kc) to reproduce content data (Data).

9 Claims, 32 Drawing Sheets

OTHER PUBLICATIONS

"intel and RSA to accelerate delivery of new PC and application security products", M2 Presswire, (Jan. 18, 1999).*

K. Yamanaka et al.; NTT R&D, vol. 44, No. 9, pp. 813–818, 1995. See PCT search report.

S. Kotani et al.; vol. 49, No. 3, May 1998. See PCT search report.

Partial translation of Ango Riron Nyumon.

* cited by examiner

FIG.2

| NAME | FUNCTION/CHARACTERISTICS | HOLD/ GENERATION POSITION |
|---|---|---|
| Data | CONTENT DATA: DISTRIBUTED AS ENCRYPTED CONTENT DATA ENCRYPTED TO ALLOW DECRYPTION WITH Kc AND TAKING THE FORM OF [Data]Kc | DISTRIBUTION SERVER |
| Data-inf | ADDITIONAL INFORMATION: PLAIN TEXT INFORMATION RELATING TO COPYRIGHT OF CONTENT DATA, SERVER ACCESS, ETC. | DISTRIBUTION SERVER |
| Kc | LICENSE KEY: DECRYPTION KEY FOR DECRYPTING ENCRYPTED CONTENT DATA | DISTRIBUTION SERVER |
| Kp(n)/Kmc(n) | PRIVATE DECRYPTION KEY UNIQUE TO CLASS OF CONTENT REPRODUCING CIRCUIT OR MEMORY CARD, n: IDENTIFIER OF CLASS | CELLULAR PHONE, MEMORY CARD |
| KPp(n)/KPmc(n) | ASYNCHRONOUS PUBLIC ENCRYPTION KEY DECODABLE WITH Kp(n)/Kmc(n),RECORDED IN THE FORM OF {Kp(n)}KPma/ {KPmc(n)}KPma BEFORE SHIPMENT,DECRYPTED TO PRODUCE ADDITIONAL INFORMATION AUTHENTICATING DECRYPTED PUBLIC ENCRYPTION KEY Kp(n)/KPmc(n) n: IDENTIFIER OF CLASS | CELLULAR PHONE, MEMORY CARD |
| Kcom | DECRYPTION KEY COMMON TO REPRODUCING CIRCUIT, UTILIZED FOR DECRYPTION OF ENCRYPTED Kc AND AC2 (ASYMMETRIC DISTRIBUTION SERVER KPcom/ REPRODUCTION CIRCUIT Kcom MAY BE USED.) | DISTRIBUTION SERVER, CELLULAR PHONE |
| KPma | AUTHENTICATION KEY | DISTRIBUTION SERVER |
| AC | PURCHASE CONDITIONS FOR LICENSE FROM USER SIDE (FUNCTION RESTRICTION, NUMBER OF LICENSE(S), ETC.) | CELLULAR PHONE |
| AC1 | RESTRICTION INFORMATION FOR MEMORY ACCESS | DISTRIBUTION SERVER |
| AC2 | CONTROL INFORMATION FOR REPRODUCING CIRCUIT | DISTRIBUTION SERVER |
| Km(i) | DECRYPTION KEY UNIQUE TO EACH MEMORY CARD (i: IDENTIFIER OF CARD) | MEMORY CARD |
| KPm(i) | ASYMMETRIC ENCRYPTION KEY DECODABLE WITH Km(i) | MEMORY CARD |
| Ks1 | SYMMETRIC KEY UNIQUE TO SESSION, GENERATED IN EVERY DISTRIBUTION SESSION | DISTRIBUTION SERVER |
| Ks2 | SYMMETRIC KEY UNIQUE TO SESSION, GENERATED IN EVERY DISTRIBUTION/TRANSFER (RECEIVING) SESSION | MEMORY CARD |
| Ks3 | SYMMETRIC KEY UNIQUE TO SESSION, GENERATED IN EVERY REPRODUCTION/TRANSFER (SENDING) SESSION | MEMORY CARD |
| Ks4 | SYMMETRIC KEY UNIQUE TO SESSION, GENERATED IN EVERY REPRODUCTION SESSION | CELLULAR PHONE |
| CONTENT ID | CODE FOR IDENTIFYING CONTENT DATA Data | DISTRIBUTION SERVER |
| LICENSE ID | ADMINISTRATION CODE FOR SPECIFYING ISSUANCE OF LICENSE (DETERMINED TOGETHER WITH CONTENT ID IN SOME CASES) | DISTRIBUTION SERVER |
| TRANSACTION ID | CODE PRODUCED IN EVERY DISTRIBUTION SESSION FOR SPECIFYING DISTRIBUTION SESSION (THIS MAY ALSO SERVE AS LICENSE ID.) | DISTRIBUTION SERVER |

FIG.14

| NAME | FUNCTION/CHARACTERISTICS | HOLD/GENERATION POSITION |
|---|---|---|
| Data | CONTENT DATA: DISTRIBUTED AS ENCRYPTED CONTENT DATA ENCRYPTED TO ALLOW DECRYPTION WITH Kc AND TAKING THE FORM OF {Data}Kc | DISTRIBUTION SERVER |
| Data-inf | ADDITIONAL INFORMATION: PLAIN TEXT INFORMATION RELATING TO COPYRIGHT OF CONTENT DATA, SERVER ACCESS, ETC. | DISTRIBUTION SERVER |
| Kc | LICENSE KEY: DECRYPTION KEY FOR DECRYPTING ENCRYPTED CONTENT DATA | DISTRIBUTION SERVER |
| Kp(n)/Kmc(n) | PRIVATE DECRYPTION KEY UNIQUE TO CLASS OF CONTENT REPRODUCING CIRCUIT OR MEMORY CARD, n: IDENTIFIER OF CLASS | CELLULAR PHONE, MEMORY CARD |
| KPp(n)/KPmc(n) | ASYNCHRONOUS PUBLIC ENCRYPTION KEY DECODABLE WITH Kp(n)/Kmc(n),RECORDED IN THE FORM OF {Kp(n)}KPma/ {KPmc(n)}KPma BEFORE SHIPMENT,DECRYPTED TO PRODUCE ADDITIONAL INFORMATION AUTHENTICATING DECRYPTED PUBLIC ENCRYPTION KEY Kp(n)/KPmc(n) n: IDENTIFIER OF CLASS | CELLULAR PHONE, MEMORY CARD |
| Kcom | DECRYPTION KEY COMMON TO REPRODUCING CIRCUIT, UTILIZED FOR DECRYPTION OF ENCRYPTED Kc AND AC2 (ASYMMETRIC DISTRIBUTION SERVER KPcom/ REPRODUCTION CIRCUIT Kcom MAY BE USED.) | DISTRIBUTION SERVER, CELLULAR PHONE |
| KPma | AUTHENTICATION KEY | DISTRIBUTION SERVER |
| AC | PURCHASE CONDITIONS FOR LICENSE FROM USER SIDE (FUNCTION RESTRICTION, NUMBER OF LICENSE(S), ETC.) | CELLULAR PHONE |
| AC1 | RESTRICTION INFORMATION FOR MEMORY ACCESS | DISTRIBUTION SERVER |
| AC2 | CONTROL INFORMATION FOR REPRODUCING CIRCUIT | DISTRIBUTION SERVER |
| Km(i) | DECRYPTION KEY UNIQUE TO EACH MEMORY CARD (i: IDENTIFIER OF CARD) | MEMORY CARD |
| KPm(i) | ASYMMETRIC ENCRYPTION KEY DECODABLE WITH Km(i) | MEMORY CARD |
| K(i) | SYMMETRIC ENCRYPTION KEY UNIQUE TO MEMORY (i: IDENTIFIER OF CARD) | MEMORY CARD |
| Ks1 | SYMMETRIC KEY UNIQUE TO SESSION, GENERATED IN EVERY DISTRIBUTION SESSION | DISTRIBUTION SERVER |
| Ks2 | SYMMETRIC KEY UNIQUE TO SESSION, GENERATED IN EVERY DISTRIBUTION/TRANSFER (RECEIVING) SESSION | MEMORY CARD |
| Ks3 | SYMMETRIC KEY UNIQUE TO SESSION, GENERATED IN EVERY REPRODUCTION/TRANSFER (SENDING) SESSION | MEMORY CARD |
| Ks4 | SYMMETRIC KEY UNIQUE TO SESSION, GENERATED IN EVERY REPRODUCTION SESSION | CELLULAR PHONE |
| CONTENT ID | CODE FOR IDENTIFYING CONTENT DATA Data | DISTRIBUTION SERVER |
| LICENSE ID | ADMINISTRATION CODE FOR SPECIFYING ISSUANCE OF LICENSE (DETERMINED TOGETHER WITH CONTENT ID IN SOME CASES) | DISTRIBUTION SERVER |
| TRANSACTION ID | CODE PRODUCED IN EVERY DISTRIBUTION SESSION FOR SPECIFYING DISTRIBUTION SESSION (THIS MAY ALSO SERVE AS LICENSE ID.) | DISTRIBUTION SERVER |

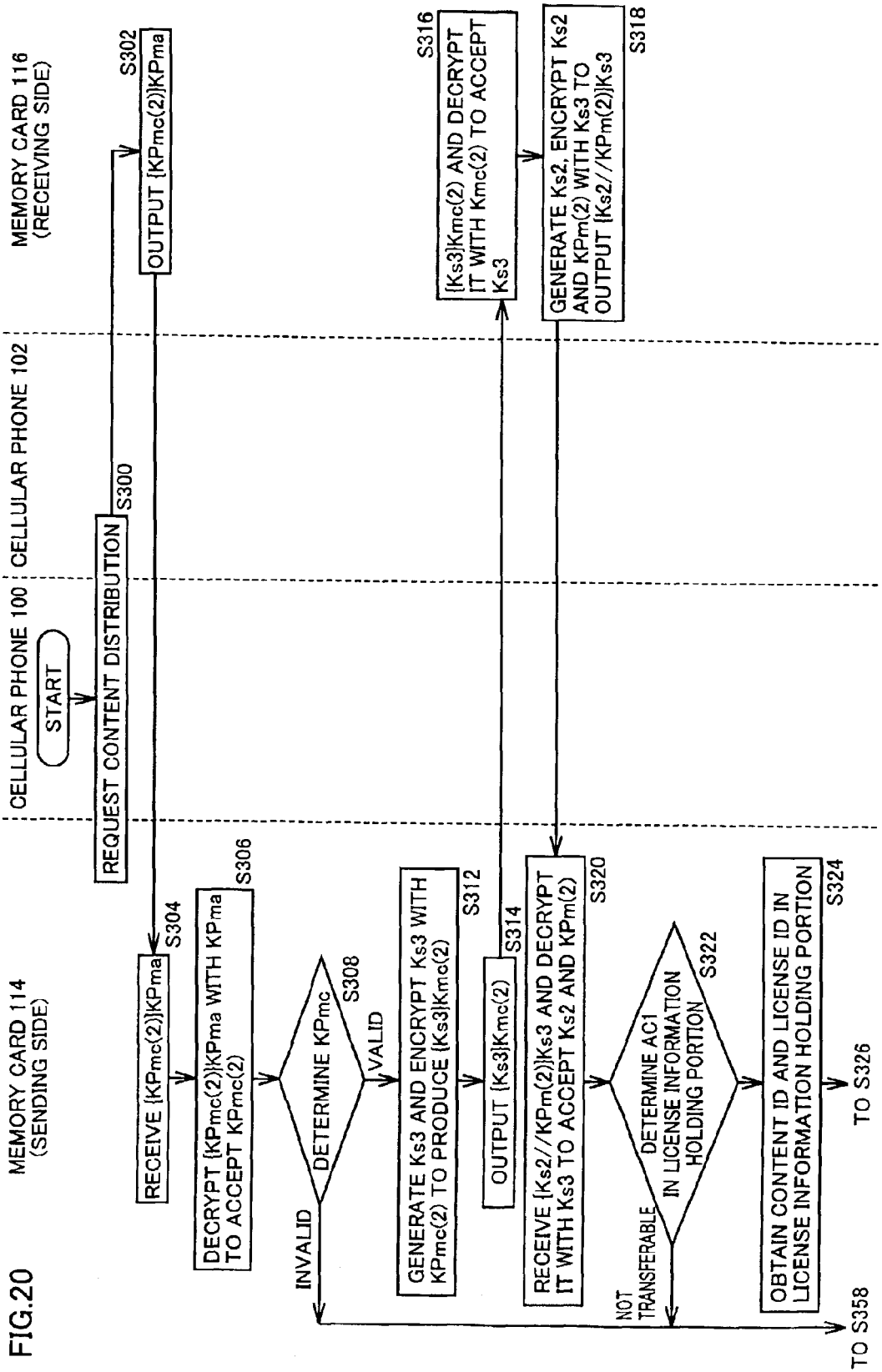

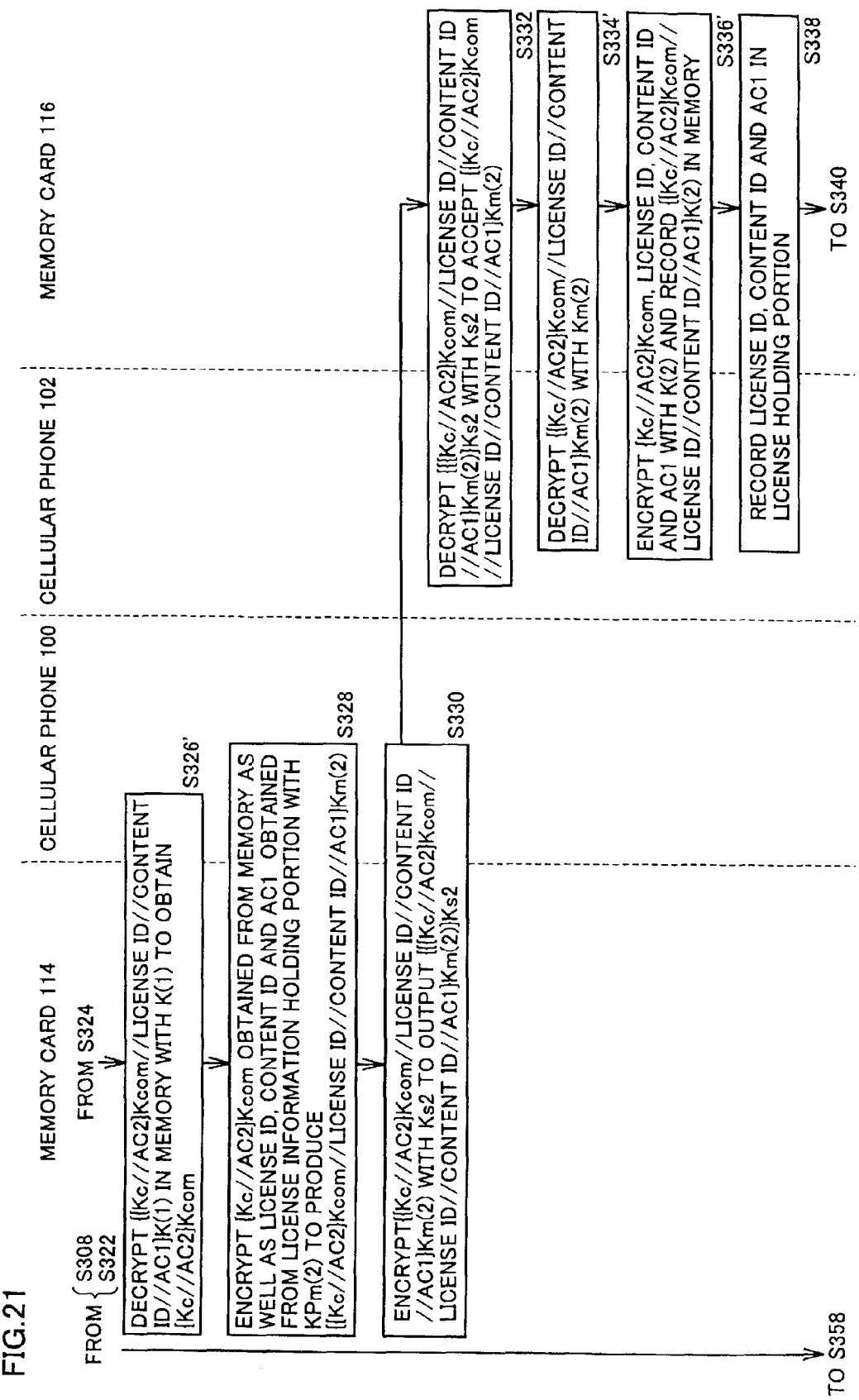

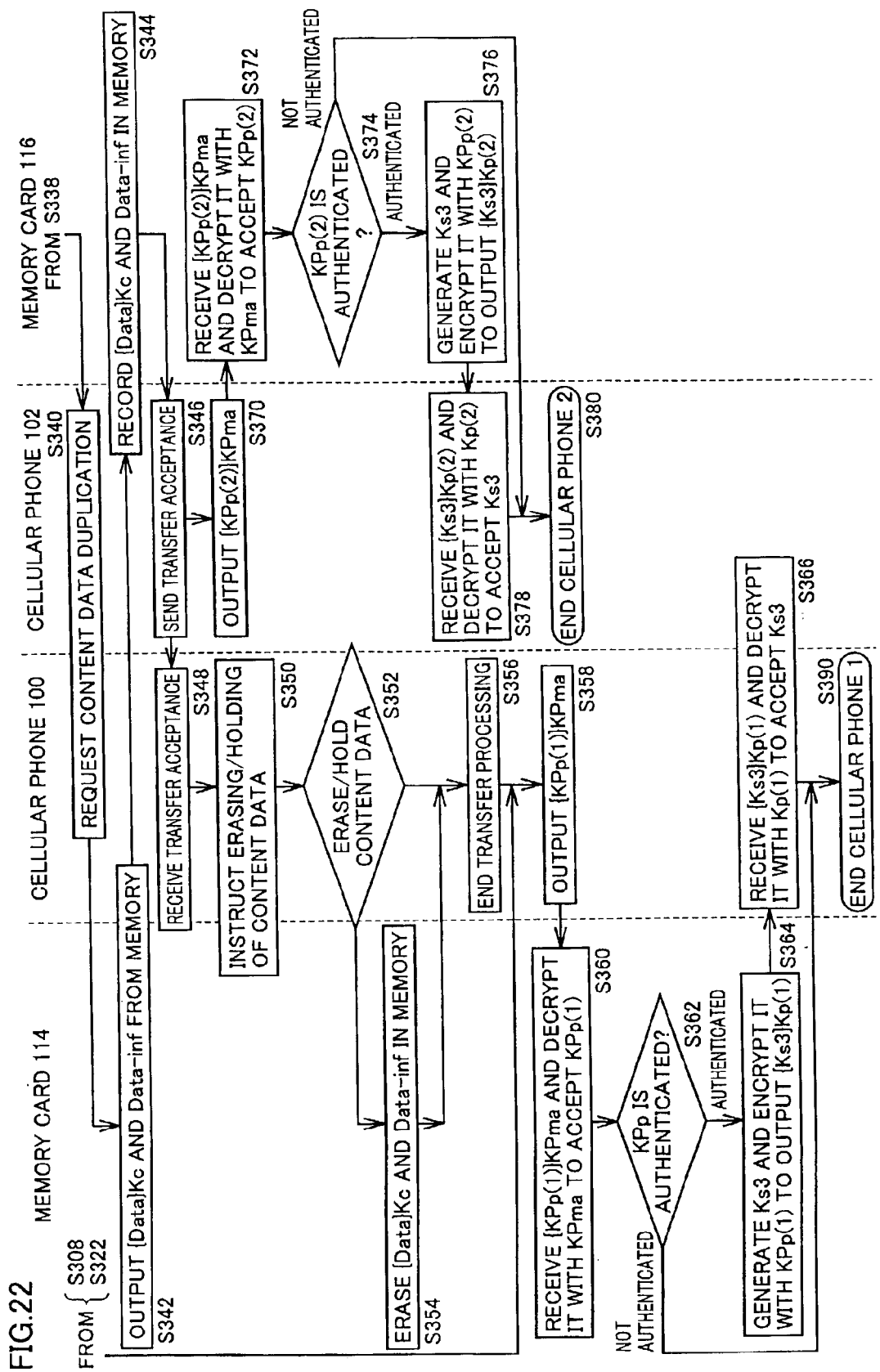

FIG.23

| NAME | FUNCTION/CHARACTERISTICS | HOLD/ GENERATION POSITION |
|---|---|---|
| Data | CONTENT DATA: DISTRIBUTED AS ENCRYPTED CONTENT DATA ENCRYPTED TO ALLOW DECRYPTION WITH Kc AND TAKING THE FORM OF [Data]Kc | DISTRIBUTION SERVER |
| Data-inf | ADDITIONAL INFORMATION: PLAIN TEXT INFORMATION RELATING TO COPYRIGHT OF CONTENT DATA, SERVER ACCESS, ETC. | DISTRIBUTION SERVER |
| Kc | LICENSE KEY: DECRYPTION KEY FOR DECRYPTING ENCRYPTED CONTENT DATA | DISTRIBUTION SERVER |
| Kp(n)/Kmc(n) | PRIVATE DECRYPTION KEY UNIQUE TO CLASS OF CONTENT REPRODUCING CIRCUIT OR MEMORY CARD, n: IDENTIFIER OF CLASS | CELLULAR PHONE, MEMORY CARD |
| KPp(n)/KPmc(n) | ASYNCHRONOUS PUBLIC ENCRYPTION KEY DECODABLE WITH Kp(n)/Kmc(n), RECORDED IN THE FORM OF {Kp(n)}KPma/ {KPmc(n)}KPma BEFORE SHIPMENT, DECRYPTED TO PRODUCE ADDITIONAL INFORMATION AUTHENTICATING DECRYPTED PUBLIC ENCRYPTION KEY Kp(n)/KPmc(n) n: IDENTIFIER OF CLASS | CELLULAR PHONE, MEMORY CARD |
| KPma | AUTHENTICATION KEY | DISTRIBUTION SERVER |
| AC | PURCHASE CONDITIONS FOR LICENSE FROM USER SIDE (FUNCTION RESTRICTION, NUMBER OF LICENSE(S), ETC.) | CELLULAR PHONE |
| AC1 | RESTRICTION INFORMATION FOR MEMORY ACCESS | DISTRIBUTION SERVER |
| AC2 | CONTROL INFORMATION FOR REPRODUCING CIRCUIT | DISTRIBUTION SERVER |
| Km(i) | DECRYPTION KEY UNIQUE TO EACH MEMORY CARD (i: IDENTIFIER OF CARD) | MEMORY CARD |
| KPm(i) | ASYMMETRIC ENCRYPTION KEY DECODABLE WITH Km(i) | MEMORY CARD |
| Ks1 | SYMMETRIC KEY UNIQUE TO SESSION, GENERATED IN EVERY DISTRIBUTION SESSION | DISTRIBUTION SERVER |
| Ks2 | SYMMETRIC KEY UNIQUE TO SESSION, GENERATED IN EVERY DISTRIBUTION/TRANSFER (RECEIVING) SESSION | MEMORY CARD |
| Ks3 | SYMMETRIC KEY UNIQUE TO SESSION, GENERATED IN EVERY REPRODUCTION/TRANSFER (SENDING) SESSION | MEMORY CARD |
| Ks4 | SYMMETRIC KEY UNIQUE TO SESSION, GENERATED IN EVERY REPRODUCTION SESSION | CELLULAR PHONE |
| CONTENT ID | CODE FOR IDENTIFYING CONTENT DATA Data | DISTRIBUTION SERVER |
| LICENSE ID | ADMINISTRATION CODE FOR SPECIFYING ISSUANCE OF LICENSE (DETERMINED TOGETHER WITH CONTENT ID IN SOME CASES) | DISTRIBUTION SERVER |
| TRANSACTION ID | CODE PRODUCED IN EVERY DISTRIBUTION SESSION FOR SPECIFYING DISTRIBUTION SESSION (THIS MAY ALSO SERVE AS LICENSE ID.) | DISTRIBUTION SERVER |

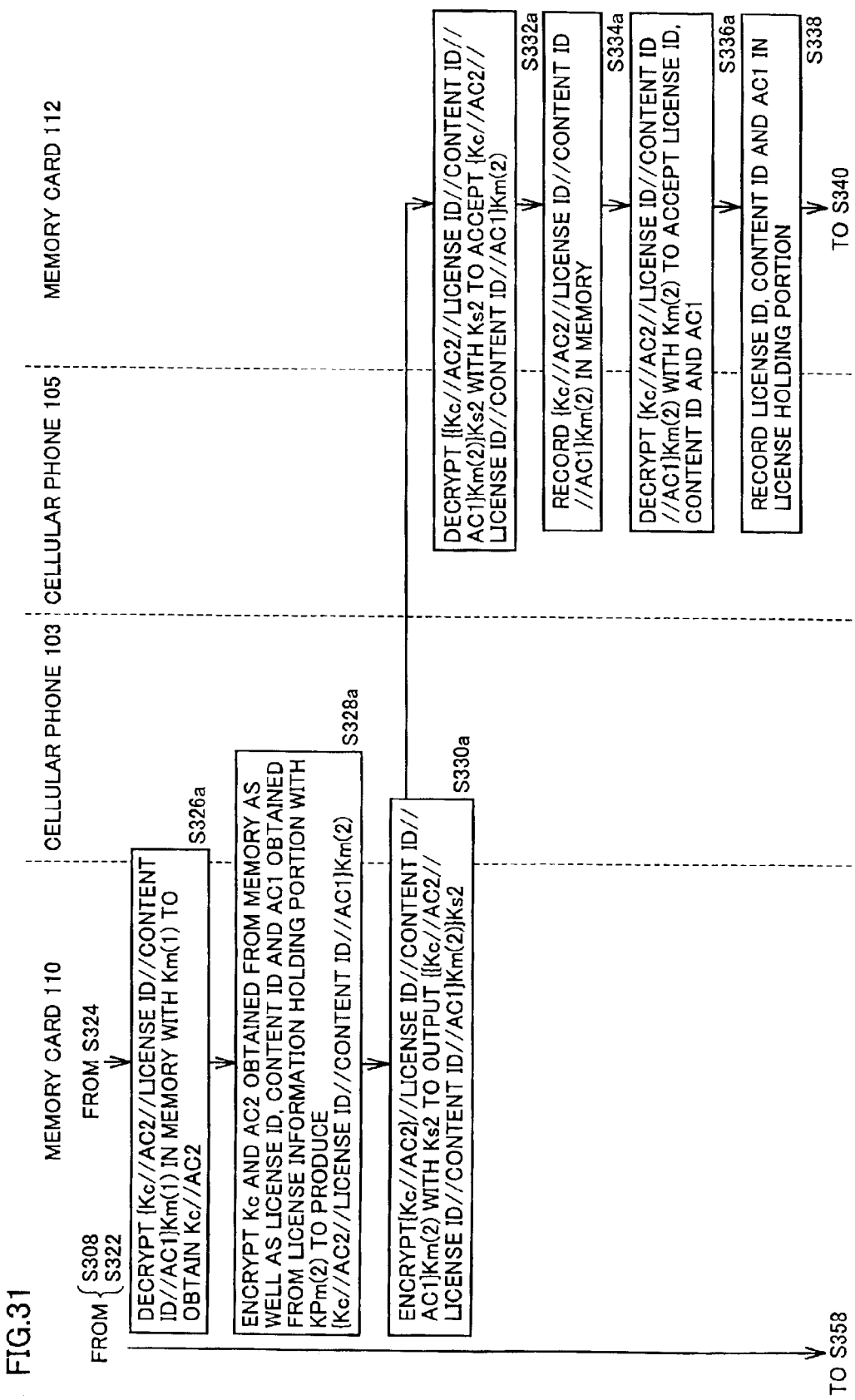

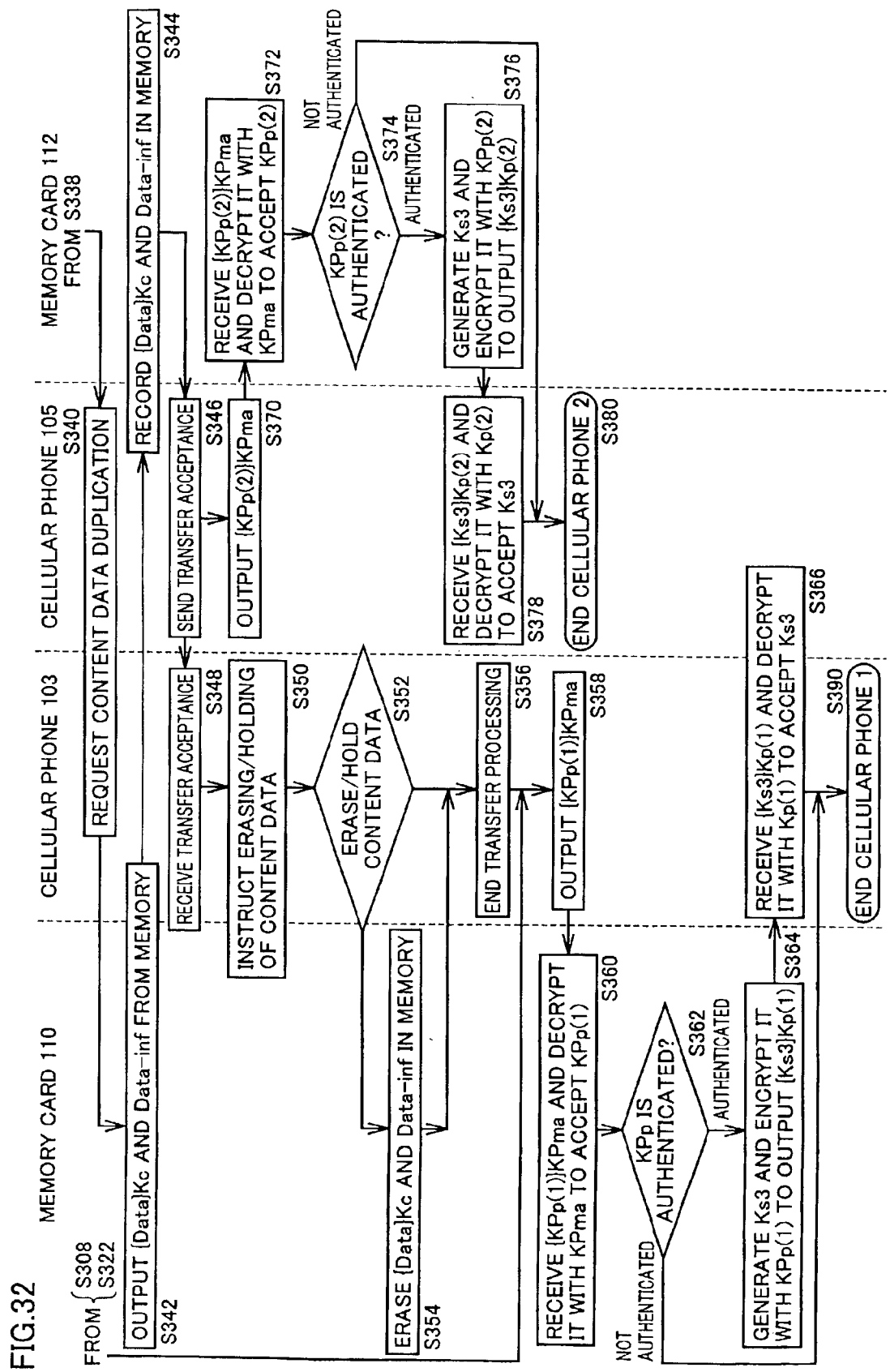

DEVICE FOR REPRODUCING DATA

TECHNICAL FIELD

The present invention relates to a data reproducing device used in an information distribution system, which can distribute information to terminals such as cellular phones, and can secure a copyright relating to copied information.

BACKGROUND ART

Owing to progress in information communication networks such as Internet in recent years, users can easily access network information through personal terminals employing cellular phones or the like.

In such information communication, information is transmitted as digital signals. Therefore, each user can copy music data and video data, which are transmitted via the information communication network, without degradation in the audio quality and picture quality.

Accordingly, the right of the copyright owner may be significantly infringed when copyrighted content data such as music information and image data are transmitted over the information communication network without appropriate measures for protecting the copyrights.

Conversely, top priority may be given to the copyright protection by disabling or inhibiting distribution of content data over the digital data communication network, which is growing exponentially. However, this causes disadvantages to the copyright owner who can essentially collect a predetermined copyright royalty for copying copyrighted materials.

In the case where the copyrighted content data such as music data is distributed over a digital information network, e.g., configured as described above, each user records the distributed content data on an appropriate recording device, and then reproduces it by a reproducing device.

The recording device for such a purpose may be a medium such as a memory card, which allows electrical writing and erasing of data.

Further, the device for reproducing the content data may be formed of a cellular phone itself, which is used for receiving the content data, or may be a dedicated reproducing device if the recording device is a memory card or the like, and is removably attached to the device receiving the distribution data.

In the above case, security measures are required for the record medium so that the distributed content data cannot be freely transferred from the record medium receiving the data of another record medium or the like without authorization from a copyright owner.

For improving the security of the above system, which is configured to transfer data between devices forming the system and/or through an externally accessible region within the device, it is necessary to give sufficient consideration to authentication processing, encryption processing and others.

As a higher level of security is employed in the authentication processing and encryption processing, an unnecessarily longer time is required even in a regular device before starting the reproduction of the content data for listening or viewing it.

DISCLOSURE OF THE INVENTION

An object of the invention is to provide a data reproducing device for reproducing distributed content data held in a recording device, and particularly a data reproducing device having a function of protecting the content data from unauthorized access to the content data by a person other than a user.

Another object of the invention is to provide a data reproducing device, which can improve a security of a data distribution system, and can quickly start processing of reproducing content data.

For achieving the above objects, the invention provides a data reproducing device for decrypting encrypted content data to reproduce content data, including a data storing portion, a data reproducing portion and a first control portion.

The data storing portion holds the encrypted content data and a license key for decrypting the encrypted content data, outputs the license key in an encrypted form and is removably attached to the data reproducing device. The data reproducing portion receives the output of the data storing portion, and reproduces the encrypted content data. The first control portion controls transmission between the data storing portion and the data reproducing portion.

The data reproducing portion includes a first decryption processing portion, an authentication data holding portion, a private key holding portion, a second decryption processing portion, a first session key generating portion, a first encryption processing portion and a third decryption processing portion. The first decrypting portion receives the license key and the encrypted content data read from the data storing portion, and decrypts the encrypted content data with the license key to extract content data. The authentication data holding portion holds authentication data prepared by encrypting a public key preapplied to the data reproducing portion into a form decodable with a public authentication key for outputting the encrypted authentication data to the data storing portion. The private key holding portion holds a private key used for decrypting data encrypted with the preapplied public key. The second decryption processing portion receives a first session key encrypted with the public key and supplied from the data storing portion, performs decryption with the private key to extract the first session key and holds the extracted first session key. The first session key generating portion produces a second session key to be updated upon every access to the data storing portion for obtaining the license key. The first encryption processing portion encrypts the second session key with the first session key held by the second decryption processing portion for output to the data storing portion. The third decryption processing portion receives the license key encrypted with the second session key and supplied from the data storing portion, performs the decryption with the second session key to extract the license key, and supplies the extracted license key to the first decryption processing portion.

The data storing portion includes a recording portion, a fourth decryption processing portion, a second control portion, a second session key generating portion, a second encryption processing portion, a fifth decryption processing portion and a third encryption processing portion. The recording portion records the encrypted content data and the license key. The fourth decryption processing portion receives the authentication data, and decrypts the authentication data with the public authentication key to extract the public key. The second control portion performs authentication processing based on results of the decryption processing by the fourth decryption processing portion to determine whether the license key is to be output to the data reproducing portion or not. The second session key generating portion produces and holds the second session key to be updated every time the second control portion determines that the license key is to be output to the data reproducing portion. The second encryption processing portion encrypts the second session key with the public key for applying the second session key to the data reproducing portion. The fifth decryption processing portion decrypts, with the first session key, the second session key applied from the data reproducing portion and encrypted with the first session key to extract the first session key. The third encryption processing portion encrypts the license key with the second session key for applying the license key to the data reproducing portion.

The first control portion performs the control to utilize the first session key common to processing of supplying the plurality of license keys to the content reproducing portion from the data storing portion corresponding to the plurality of continuous reproduction operations of the encrypted content data, to utilize, in each of the license key supply operations, the second session key different from those for the other license key supply operations, and controls the second decryption processing portion to hold the first session key during a predetermined period common to the plurality of license key supply operations.

Preferably, the predetermined period is a period determined within an active period of the data reproducing device and after attachment of the data storing portion to the data producing portion.

Preferably, the predetermined period is a period determined after the reproducing device carrying the data storing portion becomes active.

According to another aspect, the invention provides a data reproducing device for storing encrypted content data and a license key for decrypting the encrypted content data, forming an encryption communication path for output of the license key, receiving the encrypted content data and the license key from a data recording device outputting the license key via the encryption communication path, and reproducing the encrypted content data, including a control portion, a first decryption processing portion, an authentication data holding portion, a private key holding portion, a second decryption processing portion, a first session key generating portion, a first encryption processing portion and a third decryption processing portion.

The control portion controls transmission of the data between the data recording device and the data reproducing device. The first decryption processing portion receive the license key and the encrypted content data read from the data recording device, and decrypts the encrypted content data with the license key to extract the content data. The authentication data holding portion holds authentication data ({KPp(1)}KPma) prepared by encrypting private key (KPp(1)) preapplied to the data reproducing portion into a form decodable with a public authentication key (KPma) for outputting the encrypted authentication data to the data recording device. The private key holding portion holds a private key used for decrypting data encrypted with the preapplied public key. The second decryption processing portion receives a first session key updated upon every input of the authentication data, encrypted with the public key and supplied from the data recording device, performs decryption with the private key to extract the first session key and holds the extracted first session key. The first session key generating portion produces a second session key to be updated upon every access to the data recording device for obtaining the license key. The first encryption processing portion encrypts the second session key with the first session key held by the second decryption processing portion for output to the data recording device. The third decryption processing portion receives the license key (Kc) encrypted with the second session key and supplied from the data recording device, performs the decryption with the second session key to extract the license key, and supplies the extracted license key to the first decryption processing portion.

The control portion performs the control to utilize the first session key common to processing of supplying the plurality of license keys to the content reproducing portion from the data storing portion corresponding to the plurality of continuous reproduction operations of the encrypted content data, to utilize, in each of the license key supply operations, the second session key different from those for the other license key supply operations, and controls the second decryption processing portion to hold the first session key during a predetermined period common to the plurality of license key supply operations.

In a distribution system of the data reproducing device according to the invention, therefore, a part of the processing of mutually authenticating the data reproducing device and a memory card is commonly utilized by a plurality of reproduction operations so that each reproduction operation can be performed rapidly.

BRIEF DESCRIPTION OF THE DRAWINGS

FIG. 2 represents characteristics of data, information and others used for communication in the data distribution system shown in FIG. 1;

FIG. 14 represents characteristics of data, information and others used for communication in the data distribution system of the second embodiment;

FIG. 20 is a first flowchart representing a transfer operation for transfer between two memory cards according to the second embodiment;

FIG. 21 is a second flowchart representing the transfer operation for transfer between the two memory cards according to the second embodiment;

FIG. 22 is a third flowchart representing the transfer operation for transfer between the two memory cards according to the second embodiment;

FIG. 23 represents characteristics of data, information and others used for communication in the data distribution system of the third embodiment;

FIG. 31 is a second flowchart representing the transfer operation for transfer between the two memory cards according to the third embodiment; and FIG. 32 is a third flowchart representing the transfer operation for transfer between the two memory cards according to the third embodiment.

BEST MODE FOR CARRYING OUT THE INVENTION

Embodiments of the invention will now be described with reference to the drawings.

[First Embodiment]

Figure 1:
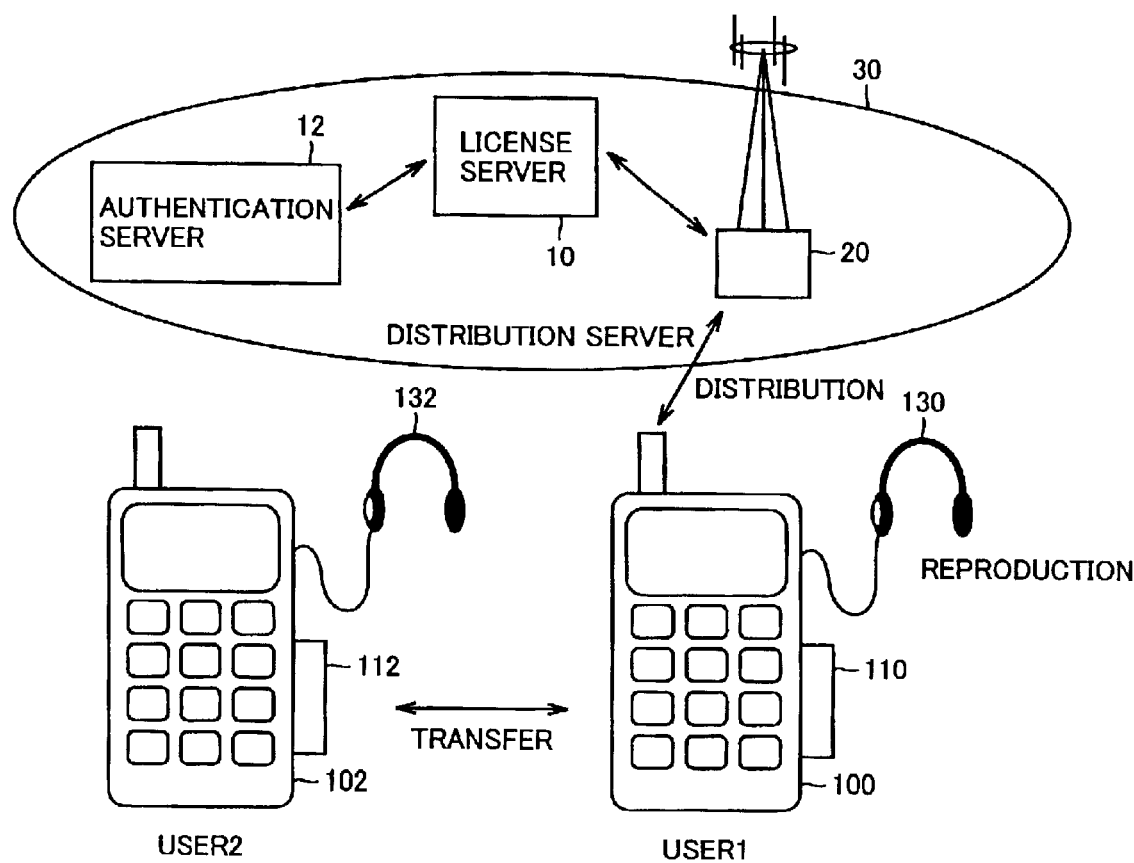
FIG. 1 conceptually shows a whole structure of a data distribution system according to the invention.

FIG. 1 conceptually shows a whole structure of an information distribution system according to the invention.

The following description will be given by way of example on a structure of a data distribution system, in which music data is distributed to users over a cellular phone network. As will be apparent from the following description, the invention is not restricted to such an example, and may be applied to other cases, in which content data such as image data, movie data, educational material data, recitation (voice) data or a game program is distributed over another information communication network.

Referring to FIG. 1, a license server 10 administrating copyrighted music data encrypts music data (which will be also referred to as "content data" hereinafter) in a predetermined encryption manner, and applies the data thus encrypted to a cellular phone company, which is a distribution carrier 20 for distributing information. An authentication server 12 determines whether a cellular phone and a memory card of a user, who made access for requesting for distribution of the content data, are regular devices or not.

Distribution carrier 20 relays over its own cellular phone network the distribution request received from each user to license server 10. When license server 10 receives the distribution request, authentication server 12 determines whether the cellular phone and memory card of the user are regular devices or not. After it is confirmed that these are regular devices, license server 10 encrypts the requested content information, and distributes the content data to the user's cellular phone over the cellular phone network of distribution carrier 20.

In FIG. 1, a cellular phone 100 of a user 1 includes, e.g., a memory card 110, which is releasably attached thereto. Memory card 110 receives encrypted content data received by cellular phone 100, decrypts the data encrypted for the transmission, and applies the data to a music reproducing unit (not shown) in cellular phone 100.

Further, user 1 can listen to music, which is produced by reproducing such content data, via headphones 130 or the like connected to cellular phone 100.

In the following description, license server 10, authentication server 12 and distribution carrier (cellular phone company) 20 described above will be collectively referred to as a "music server 30" hereinafter.

Also, the processing of transmitting the content data from music server 30 to each cellular phone or the like will be referred to as "distribution" hereinafter.

Owing to the above structure, a user other than a regular user, who purchased a regular cellular phone and a regular memory card, cannot receive and reproduce the data distributed from music server 30 without difficulty.

Further, the system may be configured as follows. By counting the times of distribution of content data, e.g., for one song in distribution carrier 20, the royalty, which is charged every time the user receives the distributed content data, can be collected by distribution carrier 20 together with charges for telephone calls so that the copyright owner can easily ensure the royalty.

The foregoing distribution of the content data is performed over a closed system, i.e., the cellular phone network so that it is easy to take measures for the copyright protection, compared with open systems such as the Internet.

For example, a user 2 having a memory card 112 can receive content data directly from music server 30 by user's own cellular phone 102. However, such data reception may take a relatively long time if user 2 receives the content data or the like having a large information amount directly from music server 30. In connection with this, the system may be configured such that user 2 can copy the content data of user 1, who has already received it. This improves the convenience of users.

From the viewpoint of protecting right of the copyright owner, it is not allowed to provide a system configuration allowing free copying of content data.

In an example shown in FIG. 1, an operation, in which the content data itself received by user 1 is copied, and reproduction information required for reproducing the content data of user 1 is moved or transferred to user 2, is referred to as "transfer" of the music data. In this case, the encrypted content data and the information (i.e., reproduction information) required for the reproduction are transferred between memory cards 110 and 112 via cellular phones 100 and 102. As will be described later, the above "reproduction information" has a license key, which allows decryption or decoding of the content data encrypted in accordance with the predetermined cryptosystem, as well as license information such as a license ID and information relating to restrictions on access and reproduction.

In contrast to the "transfer", an operation of copying content data itself is referred to as "duplication". In the duplication, reproduction information required is not duplicated so that user 2 content data cannot reproduce the content data. Although not described in detail, user 2 can reproduce the content data by performing additional distribution of only the reproduction information including the license key.

Owing to the above structures, a user who received the content data from distribution server 30 can flexibly utilize the data.

If cellular phones 100 and 102 are PHSs (Personal Handy Phones), a telephone conversation can be performed in a so-called transceiver mode. By using this function, information can be transferred between users 1 and 2.

In the structure shown in FIG. 1, the system requires the following cryptosystems and structure for reproducing the content data, which is distributed in the encrypted form, on the user side. First, the system requires a cryptosystem for distributing an encryption key in the communication. Second, the system requires a cryptosystem for encrypting the data itself to be distributed. Third, the system requires a structure for protecting data by preventing unauthorized copying of the distributed data.

In the embodiment of the invention, when each of sessions of distribution and reproduction occurs, the destination or receiver of the content data is verified and checked sufficiently, and the content reproducing circuit (e.g., a cellular phone) can start the reproduction of the content data within a reduced time. The structures for these operations and effects will now be described.

[Structures of Data and Keys in System]

FIG. 2 collectively represents characteristics of keys relating to encryption for communication in the data distribution system shown in FIG. 1 as well as data and others to be distributed.

First, data Data is content data such as music data distributed from the distribution server. As will be described later, content data Data distributed from distribution server 30 takes a form of encrypted content data {Data}Kc, which is encrypted to allow decryption at least with a license key Kc.

In the following description, expression "{Y}X" represents that the data indicated by this expression was prepared by converting data Y into an encrypted form decodable with a decryption key X.

Together with the content data, distribution server 30 distributes additional information data Data-inf in plain text, which relates to the content data, or relates to access to the server. More specifically, additional information data Data-inf includes information for specifying a song title, an artist name and others of the content data, and also includes information for specifying distribution server 30 and other information.

The following keys are used for encryption processing and decryption/reproduction processing of the content data as well as for authentication of the content reproducing circuit (i.e., cellular phone) and the recording device (i.e., memory card).

As already described, license key Kc is used for decrypting and encrypting the content data. Also, public encryption key KPp(n) is used for authentication of the content reproducing circuit (cellular phone 100) and public encryption key KPmc(n) is used for authentication of the memory card.

The data encrypted with public encryption keys KPp(n) and KPmc(n) can be decrypted with private decryption key Kp(n) and private decryption key Kmc(n) unique to the memory card. These unique private decryption keys for each cellular phone or each memory card have contents different from those of the other kinds of cellular phones or the other kinds of memory cards. These kinds of the cellular phones and memory cards depend on respective units, which are determined based on kinds of manufacturers of them, manufacturing dates or periods (manufacturing lots) and others. The natural number "n" is added for identifying the kind of each memory card and each content reproducing circuit (cellular phone). The unit, which is common to public encryption keys KPmc(n) and KPp(n), will be referred to as a "class" hereinafter.

As secret keys common to the content reproducing circuit, the system employs a secret key Kcom, which is primarily utilized for obtaining license key Kc and restriction information for the content reproducing circuit to be described later, as well as an authentication key KPma operated commonly in whole the distribution system. Secret key Kcom is a decryption key in the symmetric key cryptosystem, and therefore is held as the encryption key in the distribution server.

Secret key Kcom is not restricted to the decryption key in the symmetric key cryptosystem, and may have a similar structure as private key in the public key cryptosystem. In this case, the distribution server may be configured to hold public encryption key KPcom, which is asymmetric to the decryption key, as an encryption key.

Public encryption keys KPmc(n) and KPp(n), which are determined depending on the memory card and the content reproducing circuit as described above, are recorded in the memory card and the cellular phone before shipment, and take the forms of authentication data {KPmc(n)}KPma and {KPp(n)}KPma, respectively. The authentication data is a key, which can be decrypted with authentication key KPma to verify the validity of the authentication data from results of this decryption. In other words, the authentication data is a key used for authorizing the public encryption key. The encryption for producing the authentication data is performed with a private key K, which is paired with and is asymmetric to the authentication key.

Further, the system uses information for controlling operations of the devices forming the system, i.e., devices such as cellular phone 100 (i.e., content reproducing circuit) and memory card 110, and the above information includes purchase conditions information AC, which is sent from cellular phone 100 to distribution server 30 for designating purchase conditions when the user purchases the license key or the like, access restriction information AC1, which is distributed from distribution server 30 to memory card 110 in accordance with purchase condition information AC for representing restrictions or the like on the allowed times of access to memory card 110, and reproducing circuit restriction information AC2, which is distributed from distribution server 30 to cellular phone 100 for representing restrictions on the reproduction conditions of the content reproducing circuit. For example, the reproduction conditions of the content reproducing circuit relate to conditions, which are used when a sample of a new song is distributed at a low price or no charge for sales promotion, and allow reproduction from the start of the content data only for a limited time.

As keys for administering the data in memory card 110, the system employs private encryption key KPm(i) (i: natural number) determined for each medium, i.e., memory card, and private decryption key Km(i), which is unique to each memory card and allows decryption of the data encrypted with private encryption key KPm(i). The natural number "i" is added for identifying each memory card from the others.

Further, the data distribution system shown in FIG. 1 uses the following keys and others in the data communication.

As the encryption keys for keeping secrecy in the data transmission from and into the memory card, the system uses symmetric keys Ks1-Ks4, which are produced by distribution server 30, cellular phone 100 or 102, and memory card 110 or 112 upon every distribution, reproduction and transfer of the reproduction information.

Symmetric keys Ks1-Ks4 are unique symmetric keys, and are generated in response to every "session", which is a unit of communication or access between or to the distribution server, cellular phone and/or memory card. These symmetric keys Ks1-Ks4 will be referred to as "session keys" hereinafter.

These session keys Ks1-Ks4 have values unique to each communication session, and is administered by the distribution server, cellular phone and memory card.

More specifically, the license server in the distribution server generates session key Ks1 in response to every distribution session. The memory card generates session key Ks2 in response to every distribution session and every transfer session (receiving side). The memory card likewise generates session key Ks3 in response to every reproduction session and every transfer session (sending side). The cellular phone generates session key Ks4 in response to every reproduction session. In each session, these session keys are exchanged, and the session key produced by another device is received, and is used for encrypting the license key therewith, and then the license key and others thus encrypted are sent so that the security level in the sessions can be improved.

Further, the data transmitted between the distribution server and the cellular phone includes a content ID, by which the system identifies the content data, a license ID which is an administration code for specifying the time and the receiver of the issued license, and a transaction ID which is a code produced in response to every distribution session for specifying each distribution session.

[Structure of License Server 10]

Figure 3:
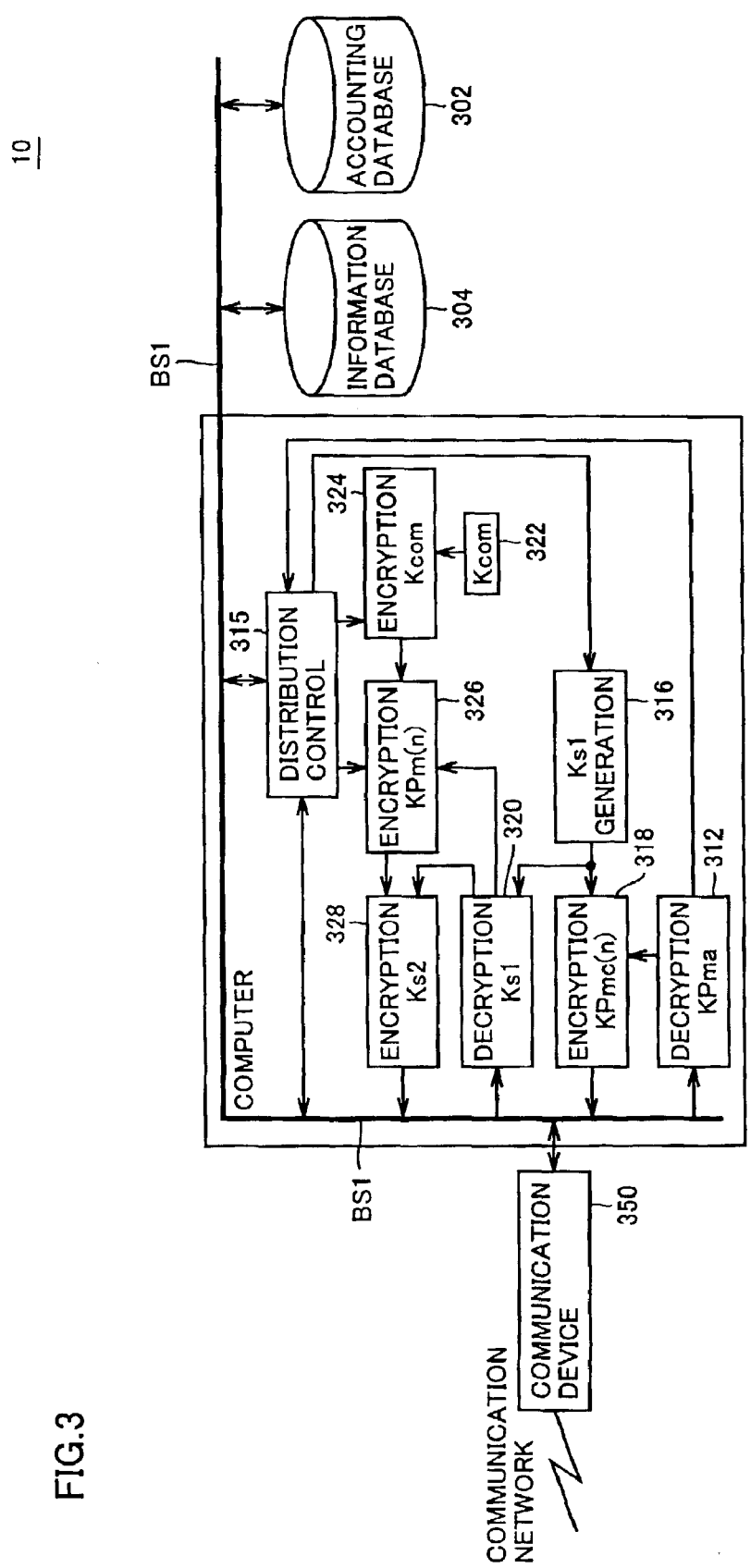
FIG. 3 is a schematic block diagram showing a structure of a license server 10.

FIG. 3 is a schematic block diagram showing a structure of license server 10 shown in FIG. 1.

License server 10 includes an information database 304 which holds data for distributing the data prepared by encrypting the music data (content data) in accordance with a predetermined cryptosystem as well as the license ID and others, an accounting database 302 for holding accounting data according to start of access to the music data for each user, a data processing portion 310, which receives data from information database 304 and accounting database 302 via a data bus BS1, and performs predetermined processing, and a communication device 350 for performing data transmission between distribution carrier 20 and data processing portion 310 over a communication network.

Data processing portion 310 includes a distribution control portion 315 for controlling an operation of data processing portion 310 in accordance with data on data bus BS1, a session key generating portion 316 for generating session key Ks1 during the distribution session under control of distribution control portion 315, a decryption processing portion 312 for receiving authentication data {KPmc(n)}KPma and {KPp(n)}KPma, which are encrypted to represent their validity by decryption, and are sent from the memory card and the cellular phone, respectively, via communication device 350 and a data bus BS1, and decrypting it with authentication key KPma, an encryption processing portion 318, which encrypts session key Ks1 produced by session key generating portion 316 with public encryption key KPmc(n) obtained by decryption processing portion 312, and outputs the encrypted key onto data bus BS1, and a decryption processing portion 320 for receiving the data, which is encrypted with session key Ks1 on each user side and is sent therefrom, via data bus BS1 and decrypting the same.

Data processing portion 310 further includes a Kcom holding portion 322 for holding secret key Kcom symmetric to the reproducing circuit as an encryption key, an encryption processing portion 324 for encrypting license key Kc and reproducing circuit restriction information AC2 applied from distribution control portion 315 with encryption key KPcom symmetric to the reproducing circuit, an encryption processing portion 326 for encrypting the data sent from encryption processing portion 324 with public encryption key KPm(i), which is obtained by decryption processing portion 320 and is unique to the memory card, and an encryption processing portion 328 for further encrypting the output of encryption processing portion 326 with session key Ks2 applied from decryption processing portion 320, and outputting the same onto data bus BS1.

In the structure described above, license server 10 utilizes secret key Kcom in the symmetric key cryptosystem as the encryption key. According to the public key cryptosystem, however, Kcom holding portion 322 holds public encryption key KPcom, which is asymmetric to secret key Kcom and can perform decryption into a form decodable with secret key Kcom, if secret key Kcom is private decryption key on the cellular phone side.

[Structure of Cellular Phone 100]

Figure 4:
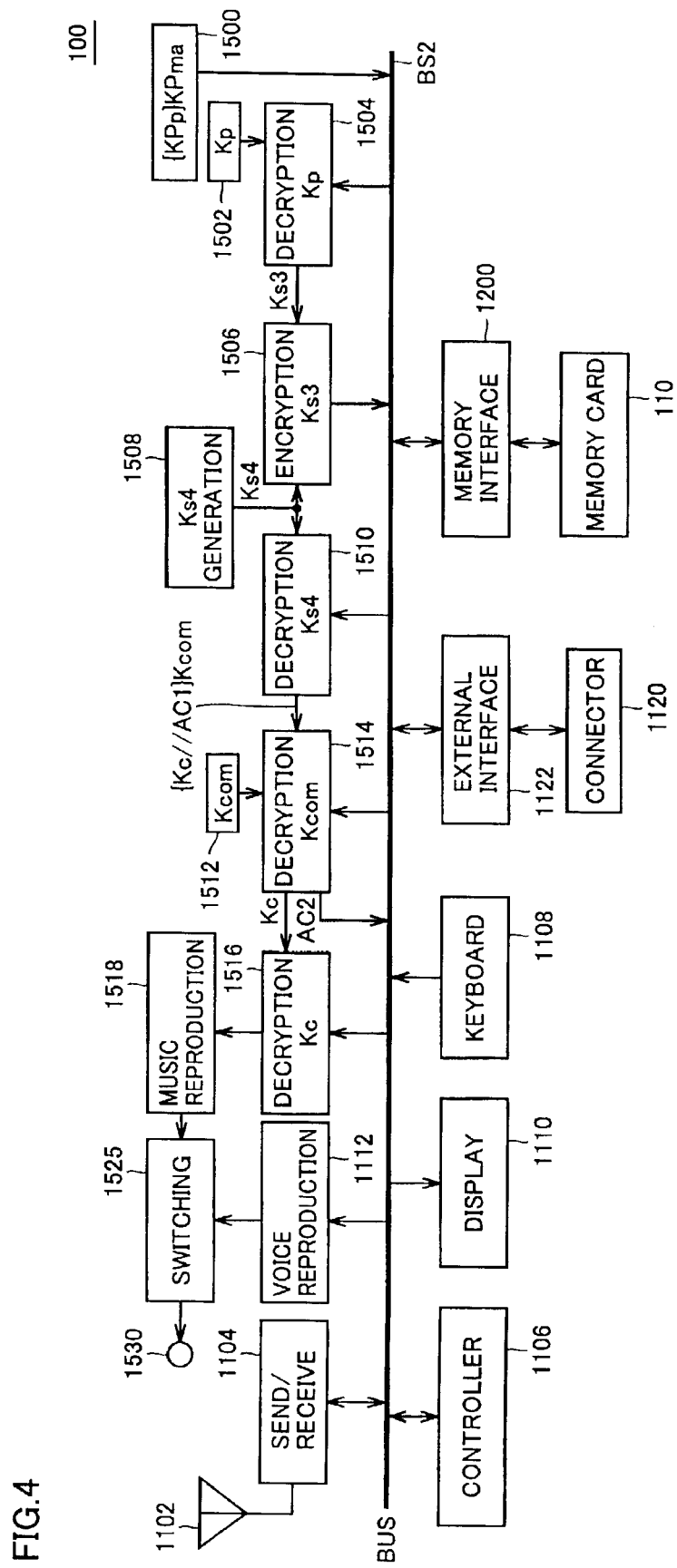
FIG. 4 is a schematic block diagram showing a structure of a cellular phone 100.

FIG. 4 is a schematic block diagram showing a structure of cellular phone 100 shown in FIG. 1.

In cellular phone 100, natural number n representing the class is equal to one.

Cellular phone 100 has an antenna 1102 for receiving radio signals sent over the cellular phone network, a send/receive portion 1104 for converting the signals received from antenna 1102 into baseband signals, and for modulating data sent from cellular phone 100 and sending it to antenna 1102, data bus BS2 for data transmission between various portions in cellular phone 100, and a controller 1106 for controlling operations of cellular phone 100 via data bus BS2.

Cellular phone 100 further includes a touch key unit 1108 for externally applying instructions to cellular phone 100, a display 1110 for giving information sent from controller 1106 or the like to the user as visible information, a voice reproducing portion 1112 for operating in an ordinary conversation operation to reproduce a voice from the received data sent via database BS2, a connector 1120 for external data transmission, and an external interface portion 1122, which can convert the data sent from connector 1120 into signals to be applied onto data bus BS2, and can convert the data applied from data bus BS2 into signals to be applied to connector 1120.

Cellular phone 100 further includes removable memory card 110 for storing and decrypting content data (music data)

sent from distribution server 30, a memory interface 1200 for controlling transmission of data between memory card 110 and data bus BS2, and an authentication data holding portion 1500 for holding data prepared by encrypting public encryption key KPp(1), which is set uniquely to each class of the cellular phone, into the form decodable with authentication key KPma.

Cellular phone 100 further includes a Kp holding portion 1502 for holding private decryption key Kp(n) (n=1) unique to the cellular phone (content reproducing circuit), a decryption processing portion 1504 for decrypting the data received from data bus BS2 with private decryption key Kp(1) to obtain session key Ks3 generated by the memory card, a session key generating portion 1508 for generating session key Ks4, e.g., based on a random number for encrypting the data to be transmitted via data bus BS2 between cellular phone 100 and memory card 110 in the reproduction session for reproducing the content data stored in memory card 110, an encryption processing portion 1506 for encrypting session key Ks4 thus produced with session key Ks3 obtained by decryption processing portion 1504, and outputting the encrypted key onto data bus BS2, and a decryption processing portion 1510 for decrypting the data on data bus BS2 with session key Ks4 to output data {Kc//AC2}Kcom.

Cellular phone 100 further includes a Kcom holding portion 1512 for holding secret key Kcom unique to the content reproducing circuit, a decryption processing portion 1514 for decrypting data {Kc//AC2}Kcom output from decryption processing portion 1510 with secret key Kcom, and outputting license key Kc and reproduction circuit restriction information AC2, a decryption processing portion 1516 for receiving encrypted content data {Data}Kc from data bus BS2, and decrypting it with license key Kc obtained from decryption processing portion 1514 to output the content data, a music reproducing portion 1518 for receiving the output of decryption processing portion 1516 and reproducing the content data, a selector portion 1525 for receiving the outputs of music reproducing portion 1518 and voice reproducing portion 1112, and selectively outputting them depending on the operation mode, and a connection terminal 1530 for receiving the output of selector portion 1525 and allowing connection of head phones 130.

Reproduction circuit restriction information AC2 output from decryption processing portion 1514 is applied to controller 1106 via data bus BS2.

FIG. 4 shows only some of blocks forming the cellular phone for the sake of simplicity, and particularly shows only blocks relating to the distribution and reproduction of music data according to the invention. Some of blocks related to an original conversation function of the cellular phone are not shown.

[Structure of Memory Card 110]

Figure 5:
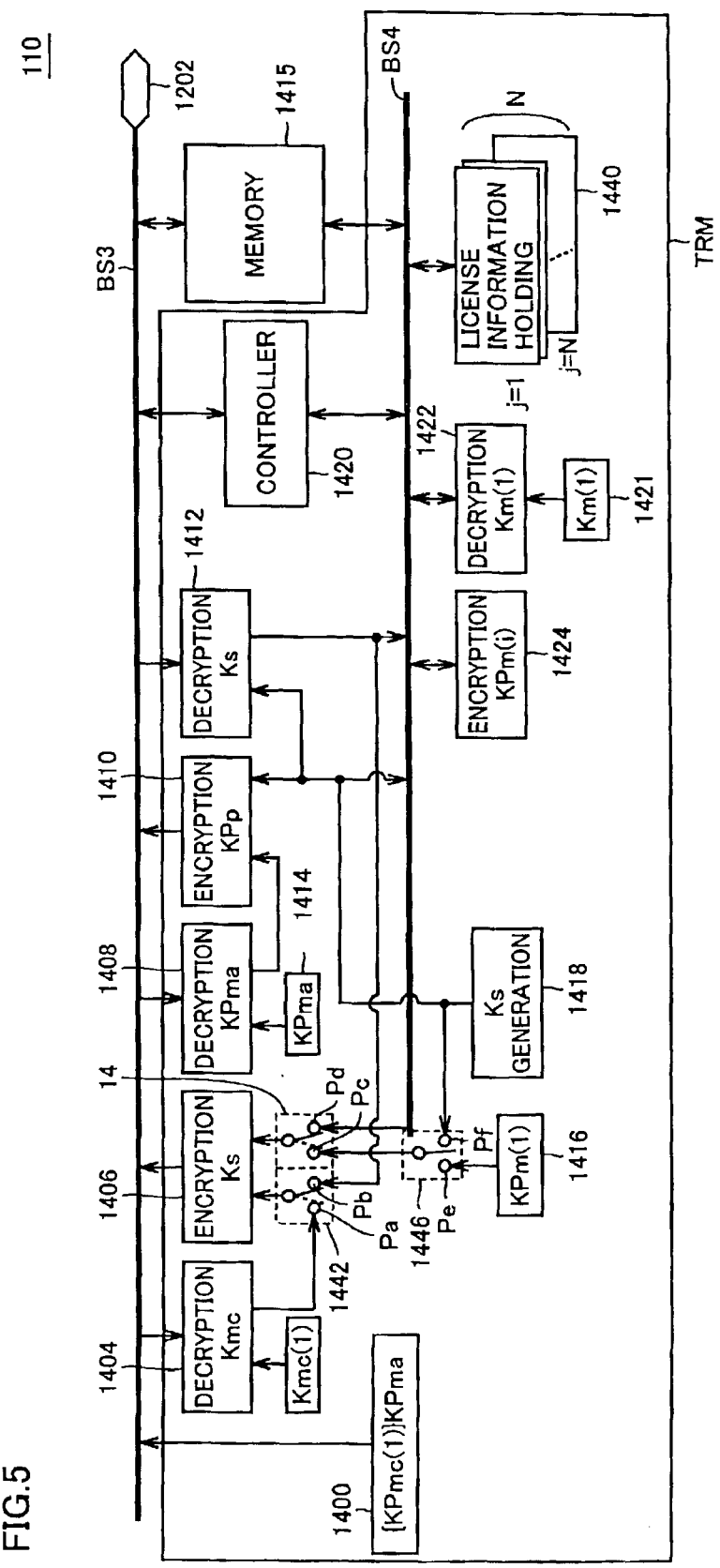
FIG. 5 is a schematic block diagram showing a structure of a memory card 110.

FIG. 5 is a schematic block diagram showing a structure of memory card 110 shown in FIG. 4.

As already described, public encryption key KPm(i) and corresponding private decryption key Km(i) have values unique to each memory card. In the following description, it is assumed that natural number i is equal to one in memory card 110. Further, keys KPmc(n) and Kmc(n) are employed as public encryption key and private decryption key unique to the kind (class) of the memory card, respectively. It is also assumed that natural number n is equal to one in memory card 110.

Memory card 110 includes an authentication data holding portion 1400 for holding {KPmc(1)}KPma as the authentication data, a Kmc holding portion 1402 for holding decryption key Kmc(1) unique to each kind of the memory card, a Km(1) holding portion 1421 for holding private decryption key Km(1) set unique to each memory card, and a KPm(1) holding portion 1416 for holding private encryption key KPm(1) allowing decryption of the data encrypted with private decryption key Km(1). Authentication data holding portion 1400 holds public encryption key KPmc(1), which is set uniquely to the kind (class) of memory card, in an encrypted form, which can be decrypted with authentication key KPma.

Memory card 110 further includes a data bus BS3 for transmitting signals to and from memory interface 1200 via a terminal 1202, a decryption processing portion 1404 for receiving the data, which is applied onto data bus BS3 from memory interface 1200, and private decryption key Kmc(1) unique to the kind of memory card sent from Kmc(1) holding portion 1402, and outputting session key Ks1, which is produced by distribution server 30 in the distribution session, or session key Ks3, which is produced by another memory card in the transfer session, to contact Pa, a decryption processing portion 1408 for receiving authentication key KPma from a KPma holding portion 1414, and performing decryption on the data applied from data bus BS3 with authentication key KPma to apply results of the decryption to a controller 1420 and decryption processing portion 1410 via data bus BS4, and an encryption processing portion 1406 for encrypting data, which is selectively applied by a select switch 1444, with the key selectively applied by a select switch 1442, and outputting the encrypted data onto data bus BS3.

Memory card 110 further includes a session key generating portion 1418 for generating session key Ks2 or Ks3 in each of distribution, reproduction and transfer sessions, an encryption processing portion 1410 for encrypting session key Ks3 generated from session key generating portion 1418 with public encryption key KPp(n) or KPmc(n) obtained by decryption processing portion 1408, and outputting the key thus encrypted onto data bus BS3, and a decryption processing portion 1412 for receiving the data encrypted with session key Ks2 or Ks3 from data bus BS3, and decrypting it with session key Ks2 or Ks3 obtained from session key generating portion 1418 to send results of the decryption onto data bus BS4.

Memory card 110 further includes an encryption processing portion 1424 for encrypting the data on data bus BS4 with public encryption key KPm(i) (i≠1) for another memory card in the transfer session (sender side), a decryption processing portion 1422 for decrypting the data on data bus BS4 with private decryption key Km(1), which is unique to memory card 110 and is paired with public encryption key KPm(1), and a memory 1415 for receiving and storing the reproduction information (license key Kc, content ID, license ID, access restriction information AC1 and reproducing circuit restriction information AC2), which is encrypted with public encryption key KPm(1) and is sent from data bus BS4, and for receiving and storing encrypted content data {Data}Kc and additional information Data-inf sent from data bus BS3.

Memory card 110 further includes a license information holding portion 1440 for holding the license ID, content ID and access restriction information AC1 obtained by decryption processing portion 1422, and a controller 1420 for externally transmitting data via data bus BS3, receiving the reproduction information and others from data bus BS4 and controlling the operation of memory card 110.

A region TRM surrounded by solid line in FIG. 5 is arranged within a module TRM, which is configured to erase internal data or destroy internal circuits for disabling reading of data and others in the circuits within this region by a third party when an illegal or improper access to the inside of memory card 110 is externally attempted. This module is generally referred to as a "tamper resistant module".

Naturally, memory 1415 may be located within module TRM. According to the structure shown in FIG. 5, however, the data held in memory 1415 is entirely encrypted so that a third party cannot reproduce the music from the content data using only the data in memory 1415, and further, it is not necessary to located memory 1415 within the expensive tamper resistance module. Therefore, the structure in FIG. 5 can reduce a manufacturing cost.

[Reproducing Operation]

(Reproduction Initialization Session)

Description will now be given on the reproducing operation (which will be referred to as the "reproduction session" hereinafter), in which music is reproduced from the encrypted content data held in memory card 110, and is externally output.

Figure 6:
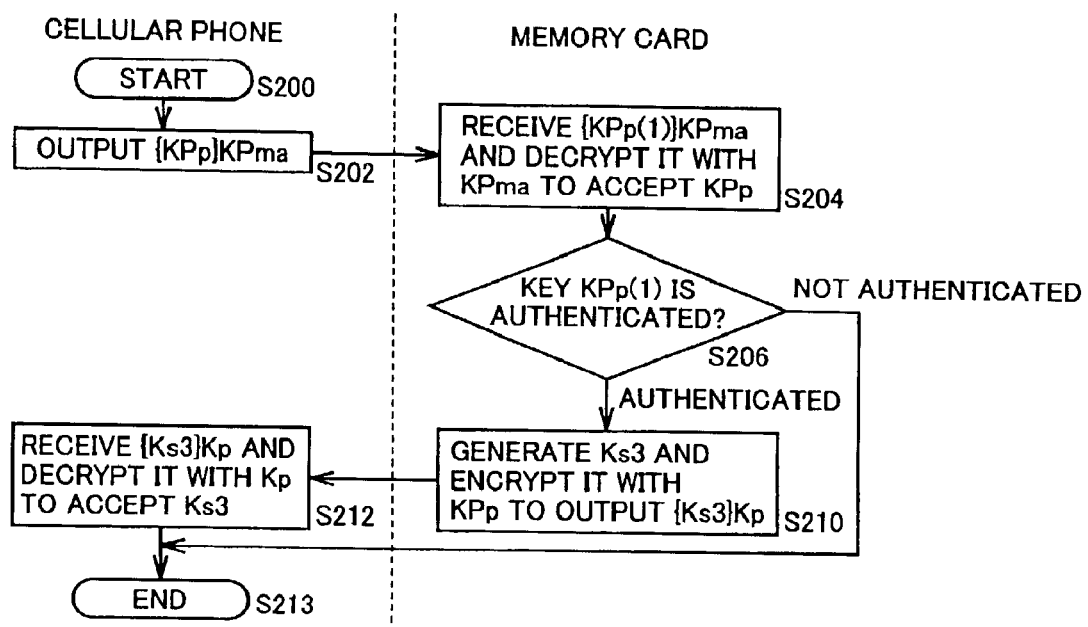
FIG. 6 is a flowchart representing a reproduction initialization session in cellular phone 100 according to the first embodiment.

FIG. 6 is a flowchart representing various operations in initialization processing, which may also be referred to as "reproduction initialization session", for performing a part of mutual authentication processing between cellular phone 100 and memory card 110.

In such a case that (i) the power of cellular phone 100, to which memory card 110 is already attached, is turned on, (ii) when memory card 110 is inserted into cellular phone 100, of which power is already on, or (iii) a new session key is produced in the distribution session, transfer session or the like, processing in the reproduction initialization session is collectively performed as will be described later, and a part of the mutual authentication processing between cellular phone 100 and memory card 110 is commonly utilized by the plurality of operations of the reproduction processing. Thereby, each reproducing operation can be performed rapidly.

Referring to FIG. 6, when the reproduction initialization session starts in accordance with the foregoing timing under the control of controller 1106 of cellular phone 100 (step S200), cellular phone 100 operates to output authentication data {KPp(1)}KPma, which can be decrypted with authentication key KPma, from authentication data holding portion 1500 onto data bus BS2 (step S202).

Authentication data {KPp(1)}KPma is transmitted to memory card 110 via data bus BS2 and memory interface 1200.

In memory card 110, decryption processing portion 1408 takes in authentication data {KPp(1)}KPma, which is transmitted onto data bus BS3 via terminal 1202. Decryption processing portion 1408 receives authentication key KPma from a KPma holding portion 1414, and decrypts the data sent from data bus BS3. If public encryption key KPp(1) encrypted with authentication key KPma is regularly registered and is regularly encrypted, and thus if decryption can be performed with authentication key KPma, and the belonging data generated by the decryption can be authenticated, the decrypted public encryption key KPp(1) is accepted. If not, or if the belonging data generated by the decryption cannot be authenticated, the obtained data is not accepted (step S243).

When decryption processing portion 1408 accepts the public encryption key KPp(1), which is unique to the content reproducing circuit in cellular phone 100, controller 1420 determines that the public encryption key KPp(1) sent thereto is the public encryption key assigned to the content reproducing circuit authenticated in this data distribution system, and the processing moves to a next step S210 (step S206). If not accepted, it is determined that invalid access is made by an unauthorized device, and the processing ends (step S240).

When public encryption key KPp(1) is accepted, controller 1420 instructs session key generating portion 1418 via data bus BS4 to produce session key Ks3 in the reproduction session. Session key Ks3 produced by session key generating portion 1418 is sent to encryption processing portion 1410. Encryption processing portion 1410 encrypts session key Ks3 with public encryption key KPp(1) of cellular phone 100 obtained by decryption processing portion 1408, and outputs encrypted data {Ks3}Kp(1) onto data bus BS3 (step S210).

Cellular phone 100 receives encrypted data {Ks3}Kp(1) applied onto data bus BS via terminal 102 and interface 1200. Encrypted data {Ks3}Kp(1) is decrypted by decryption processing portion 1504, and session key Ks3 produced by memory card 110 is accepted (step S212). Thereby, reproduction initialization session ends (step S213).

As described above, memory card 110 receives the authentication data kept in the content reproducing circuit (cellular phone 100), which is a destination of the data output for the reproduction, and verifies that cellular phone 100 is a regular reproducing device. Thereafter, memory card 100 sends session key Ks3 unique to the session for establishing connection to the verified destination. Cellular phone 100 receiving session key Ks3 and memory card 110 sending the same hold and share session key Ks3 for subsequent reproduction.

(Reproduction Processing)

Figure 7:
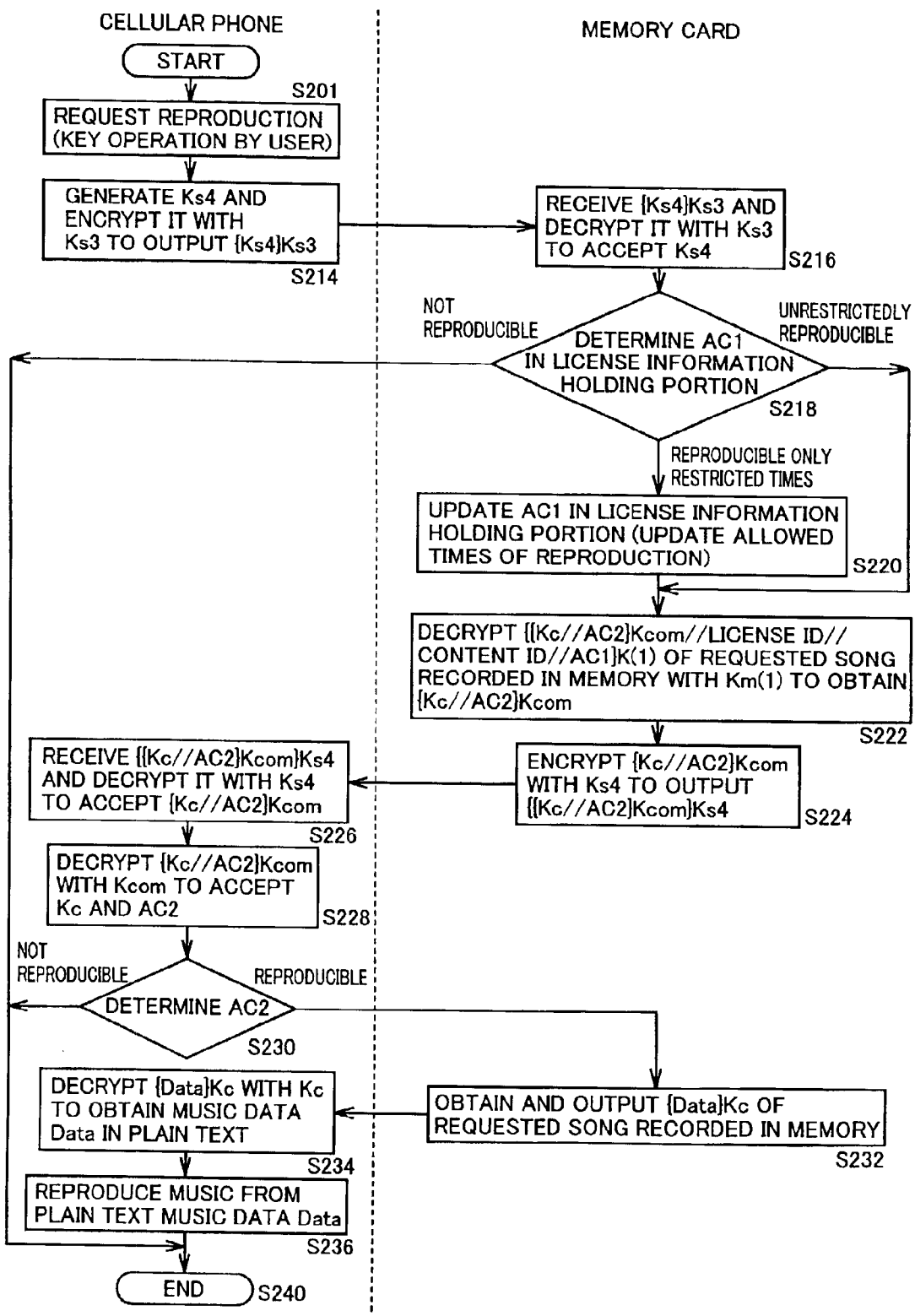
FIG. 7 is a flowchart representing a reproducing operation for reproducing music in cellular phone 100 according to the first embodiment.

FIG. 7 is a flowchart representing the reproduction processing following the reproduction initialization session in FIG. 6.

When user 1 applies an instruction to produce the reproduction request via touch key unit 1108 or the like of cellular phone 100 (step S201), controller 110 of cellular phone 100 responds to this reproduction request, and instructs session key generating portion 1508 via data bus BS2 to generate session key Ks4 produced by cellular phone 100 in the reproduction session. Session key Ks4 thus produced is sent to encryption processing portion 1506, and is encrypted with session key Ks3 obtained by decryption processing portion 1504 to produce encrypted key {Ks4}Ks3, which is output onto data bus BS2 (step S214).

Encrypted session key {Ks4}Ks3 is transmitted to memory card 110 via memory interface 1200. In memory card 110, decryption processing portion 1412 decrypts encrypted session key {Ks4}Ks3 transmitted onto data bus BS3, and session key Ks4 produced in cellular phone 100 is accepted (step S216).

In response to acceptance of session key Ks4, controller 1420 determines access restriction information AC1 in license information holding portion 1440 bearing the corresponding content ID (step S218).

In step S218, access restriction information AC1 relating to restrictions on the memory access is determined. If the reproduction is already impossible, the reproduction session ends (step S240). If the reproduction is possible but the allowed times of reproduction are restricted, the operation moves to a next step after updating the data of access restriction information AC1 to update the allowed times of reproduction (step S220). If access restriction information AC1 does not restrict the reproduction times, step S220 is skipped, and the processing moves to next step S222 without updating access restriction information AC1.

When the content ID corresponding to the requested song is not present in license information holding portion 1440, it is likewise determined that the reproduction is impossible, and the reproduction session ends (step S240).

When it is determined in step S218 that the reproduction is allowed in the current reproduction session, decryption processing is performed for obtaining license key Kc of the reproduction-requested song recorded in the memory as well as reproducing circuit restriction information AC2. More specifically, decryption processing portion 1454 operates in response to the instruction of controller 1420 to decrypt encrypted data {{Kc//AC2}Kcom//license ID//content ID// AC1}Km(1), which is read from memory 1415 onto data bus BS4, with private decryption key Km(1) unique to memory card 110. Thereby, encrypted data {Kc// AC2}Kcom decodable with secret key Kcom is obtained (step S222).

Encrypted data {Kc//AC2}Kcom thus obtained is sent to encryption processing portion 1406 via a contact Pd of select switch 1444. Encryption processing portion 1406 further encrypts encrypted data {Kc//AC2}Kcom received from data bus BS4 with session key Ks4, which is received from decryption processing portion 1412 via contact Pb of select switch 1442, and outputs {{Kc//AC2}Kcom}Ks4 onto data bus BS3 (step S224).

The encrypted data output onto data bus BS3 is sent to cellular phone 100 via memory interface 1200.

In cellular phone 100, decryption processing portion 1510 decrypts encrypted data {{Kc//AC2}Kcom}Ks4 transmitted onto data bus BS2 via memory interface 1200, and accepts data {Kc//AC2}Kcom, i.e., encrypted license key Kc and reproduction circuit restriction information AC2 (step S226). Decryption processing portion 1514 decrypts encrypted data {Kc//AC2}Kcom with secret key Kcom, which is received from Kcom holding portion 1512 and is symmetric to the content reproducing circuit, and accepts license key Kc and reproducing circuit restriction information AC2 (step S228). Decryption processing portion 1514 transmits license key Kc to decryption processing portion 1516, and outputs reproducing circuit restriction information AC2 onto data bus BS2.

Controller 1106 accepts reproducing circuit restriction information AC2 via data bus BS2, and determines the reproducibility (step S230).

When it is determined from reproducing circuit restriction information AC2 in step S230 that the reproduction is impossible, the reproduction session ends (step S240).

If the reproduction is possible, encrypted content data {Data}Kc of the requested song recorded in the memory of memory card 110 is output onto data bus BS3, and is transmitted to cellular phone 100 via memory interface 1200 (step S232).

In cellular phone 100, decryption processing portion 1516 decrypts encrypted content data {Data}Kc, which is output from memory card 110 and is transmitted onto data bus BS2, with license key Kc so that content data Data in plain text can be obtained (step S234). From decrypted content data Data in plain text, music reproducing portion 1518 reproduces music, and the reproduced music is externally output via switching portion 1525 and terminal 1530 so that the processing ends (step S240).

As described above, the reproduction initialization session is separated from the reproduction session, and is commonly utilized by the plurality of songs or tunes so that the music can be quickly started in response to the reproduction request of the user.

Further, session key Ks4 is generated for every reproduction, and is used for encryption for sending license key Kc from memory card 110 to the content reproducing circuit (cellular phone 100). Therefore, the same song can be repeated without passing the same data through memory interface 1200. Thereby, the level of security does not lower, as compared with the case where the reproduction initialization session is not separated, and is performed at the start of the every reproduction processing.

In the reproduction session, a series of operations starting from the predetermined initialization session are performed such that the encryption keys produced by the cellular phone and the memory card are mutually transmitted, and each of them executes the encryption with the received encryption key, and sends the encrypted data to the other party. As a result, mutual authentication can be performed in the operations of sending and receiving the encrypted data in the distribution session, and the security can be ensured in the data distribution system.

[Distributing Operation]

Operations in the respective sessions of the data distribution system according to the embodiment of the invention will now be described in greater detail with reference to flowcharts.

Figure 8:
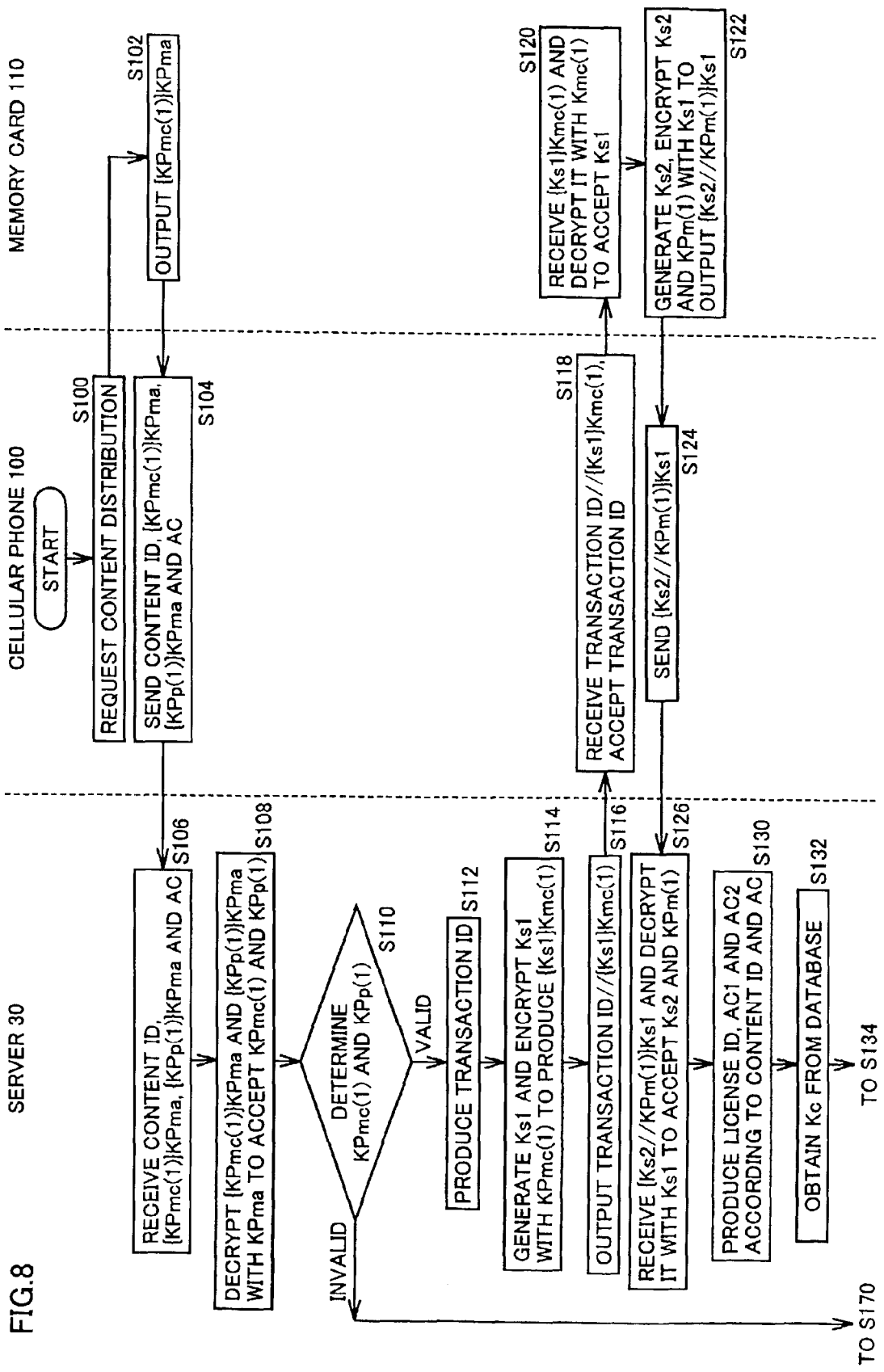
FIG. 8 is a first flowchart representing a distributing operation in the data distribution system according to the first embodiment.
Figure 9:
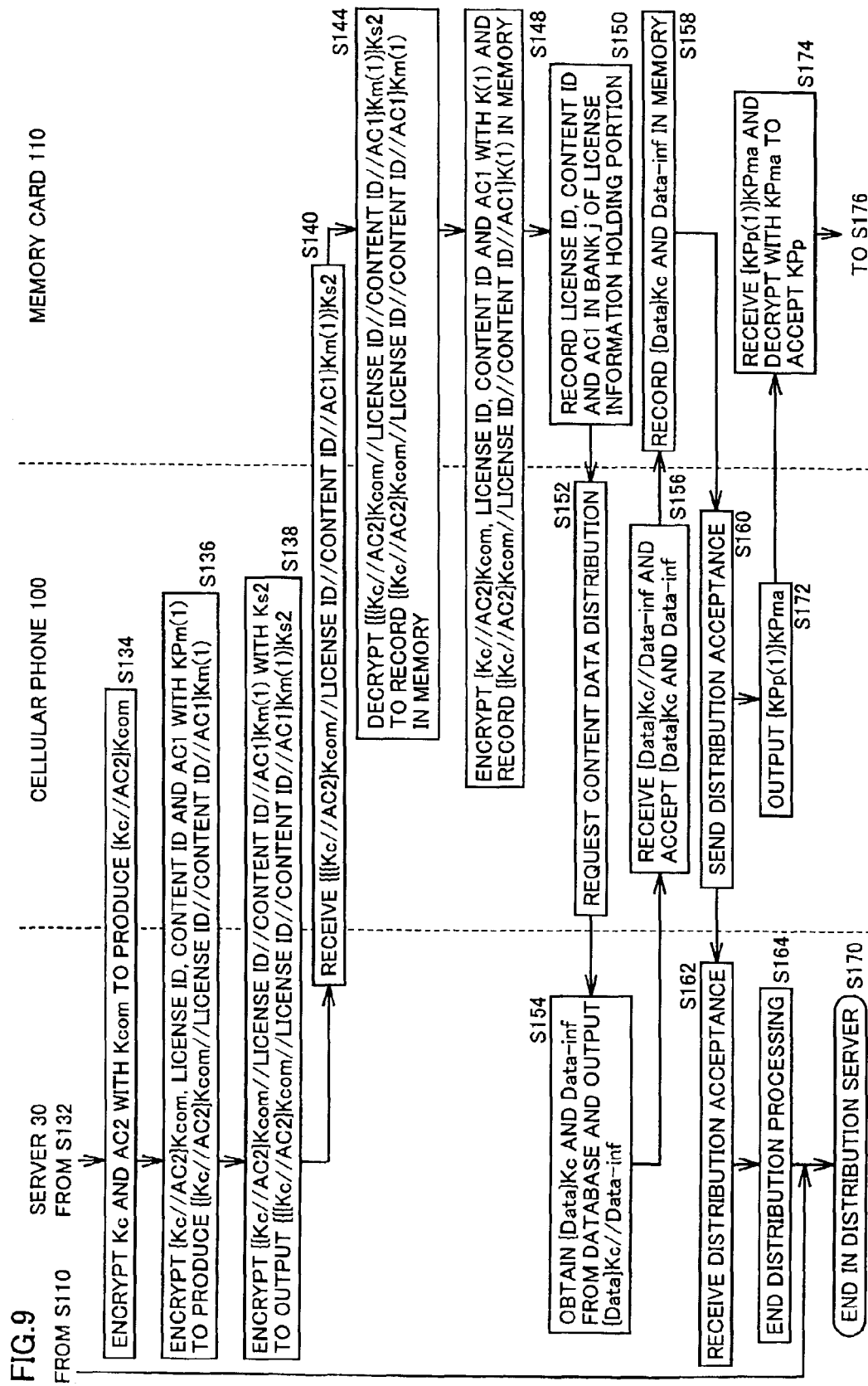
FIG. 9 is a second flowchart representing the distributing operation in the data distribution system according to the first embodiment.
Figure 10:
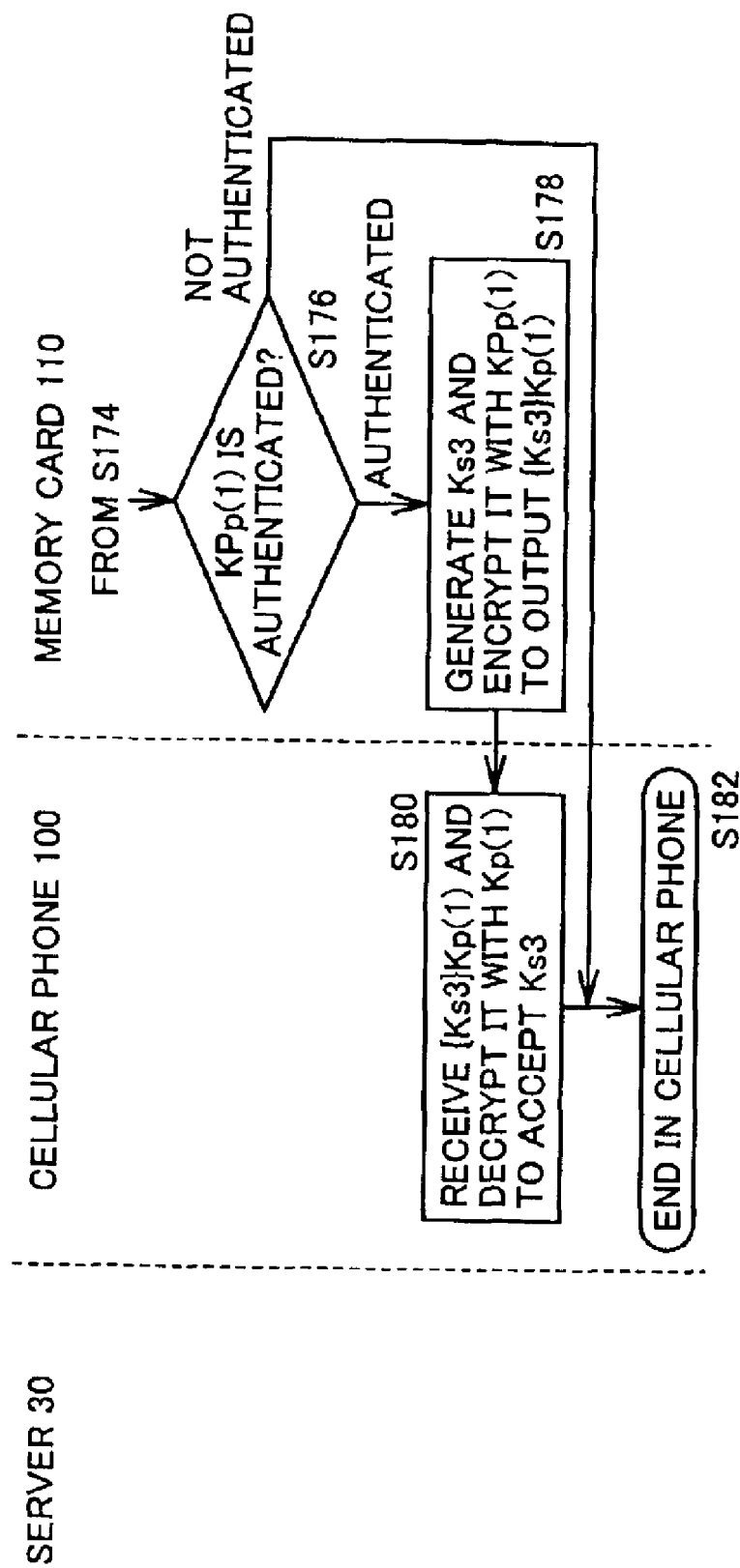
FIG. 10 is a third flowchart representing the distributing operation in the data distribution system according to the first embodiment.

FIGS. 8, 9 and 10 are first, second and third flowcharts representing a distributing operation, which will also be referred to as a "distribution session" hereinafter, and is performed when purchasing the contents in the data distribution system according to the first embodiment, respectively.

FIGS. 8 to 10 represent an operation performed when user 1 using memory card 110 receives the content data distributed from distribution server 30 via cellular phone 100.

First, user 1 requests distribution cellular phone 100 of user 1, e.g., by operating keys or buttons on touch key unit 1108 (step S100).

In memory card 110, authentication data holding portion 1400 outputs authentication data {KPmc(i)}KPma in response to this request (step S102).

Cellular phone 100 sends authentication data {KPmc(1)}KPma accepted from memory card 110 as well as authentication data {KPp(1)}KPma of cellular phone 100 itself, the content ID for designating the content data to be distributed and data AC of the license purchase conditions to distribution server 30 (step S104).

Distribution server 30 receives the content ID, authentication data {KPmc(1)}KPma and {KPp(1)}KPma, and license purchase condition data AC (step S106), and performs the decryption with authentication key KPma by decryption processing portion 312. If public encryption keys KPp(1) and KPmc(1) encrypted with authentication key KPma are registered regularly, and are encrypted regularly, public encryption key KPmc(1) of memory card 110 and public encryption key KPp(1) of cellular phone 100 are accepted. If these are not registered regularly, such unregistered public encryption keys KPp(1) and KPmc(1) are not accepted (step S108).

Distribution control portion 315 makes an inquiry to authentication server 12 based on accepted private encryption keys KPmc(1) and KPp(1) (step S110). If these public encryption keys were accepted in step 5108, and were regularly registered, these keys are determined as valid keys, and the processing moves to a next step (step S112). If the public encryption keys were not accepted, or if the public encryption keys were accepted but were not registered, these keys are determined as invalid keys, and the processing ends (step S170).

For authenticating public encryption key KPp(1) or KPmc(1) in the decryption processing performed with authentication key KPma, such a structure may be employed that a certificate, which is encrypted into a form decodable with authentication key Kpma, is sent to distribution server 30 together with each public encryption key KPp(1) or KPmc (1).

Since authentication data {KPmc(1)}KPma and {KPp(1)}KPma are encrypted into forms, which allow authentication by decrypting them with authentication key KPma, such a structure may be employed that distribution control portion 315 in license server 10 performs the authentication in its own manner in accordance with results obtained by decryption with authentication key KPma, without sending an inquiry to authentication server 12.

When it is determined from the inquiry that the keys are valid, distribution control portion 315 produces the transaction ID for specifying the distribution session (step S112).

Then, session key generating portion 316 produces session key Ks1 for distribution. Session key Ks1 is encrypted by encryption processing portion 318 with public encryption key KPmc(1) corresponding to memory card 110 and obtained by decryption processing portion 312 (step S114).

The transaction ID and encrypted session key {Ks1}Kmc(1) are externally output via data bus BS1 and communication device 350 (step S116).

When cellular phone 100 receives the transaction ID and encrypted session key {Ks1}Kmc(1) (step S118), memory card 110 operates to decrypt the received data applied onto data bus BS3 by decryption processing portion 1404 with private decryption key Kmc(1), which is held in holding portion 1402 and is unique to memory card 110, and thereby to extract decrypted session key Ks1 (step S120).

When controller 1420 confirms the acceptance of session key Ks1 produced by distribution server 30, it instructs session key generating portion 1418 to produce session key Ks2, which is to be produced during the distribution session in memory card 110. In the distribution session, session key generating portion 1418 of memory card 110 generates a new session key so that session key Ks3 held in the reproduction initialization session is rewritten into session key Ks2.

Encryption processing portion 1406 encrypts session key Ks2 and public encryption key KPm(1), which are applied via a contact Pc of select switch 144 by switching a contact of a select switch 1446, with session key Ks1 applied via contact Pa of select switch 1442 from decryption processing portion 1404, and outputs data {Ks2//KPm(1)}Ks1 onto data bus BS3 (step S122).

Data {Ks2//KPm(1)}Ks1 output onto data bus BS3 is sent from data bus BS3 to cellular phone 100 via terminal 1202 and memory interface 1200, and is sent from cellular phone 100 to distribution server 30 (step S124).

Distribution server 30 receives encrypted data {Ks2//KPm(1)}Ks1, and decrypts it with session key Ks1 by decryption processing portion 320 to accept session key Ks2 produced in memory card and public encryption key KPm(1) unique to memory card 110 (step S126).

Further, distribution control portion 315 produces the license ID, access restriction information AC1 and reproducing circuit restriction information AC2 in accordance with the content ID and license purchase condition data AC obtained in step S106 (step S130). Further, license key Kc for decrypting the encrypted content data is obtained from information database 304 (step S132).

Referring to FIG. 9, distribution control portion 315 applies license key Kc and reproducing circuit restriction information AC2 thus obtained to encryption processing portion 324. Encryption processing portion 324 uses secret key Kcom, which is obtained from Kcom holding portion 322 and is symmetric to the content reproduction circuit, as an encryption key, and encrypts license key Kc and reproducing circuit restriction information AC2 (step S134).

Encrypted data {Kc//AC2}Kcom output from encryption processing portion 324 as well as the license ID, content ID and access restriction information AC1 output from distribution control portion 315 are encrypted by encryption processing portion 326 with public encryption key KPm(1), which is obtained by decryption processing portion 320 and is unique to memory card 110 (step S136).

Encryption processing portion 328 receives the output of encryption processing portion 326, and encrypts it with session key Ks2 produced in memory card 110. Encrypted data {{{Kc//AC2}Kcom//license ID//content ID//AC1}Km(1)}Ks2 output from encryption processing portion 328 is sent to cellular phone 100 via data bus BS1 and communication device 350 (step S138).

As described above, distribution server 30 and memory card 110 exchange the session keys produced thereby, and each execute the encryption with the received encryption key for sending the encrypted data to the other party. Thereby, mutual authentication can also be actually or practically performed when sending and receiving the encrypted data, and thereby the security level in the data distribution system can be improved.

Cellular phone 100 receives encrypted data {{{Kc//AC2}Kcom//license ID//content ID//AC1}Km(1)}Ks2 sent thereto (step S140), and memory card 110 operates to decrypt the received data applied via memory interface 1200 onto data bus BS3 by decryption processing portion 1412. Thus, decryption processing portion 1412 decrypts the data received from data bus BS3 with session key Ks2 applied from session key generating portion 1418, and outputs the decrypted key onto data bus BS4.

In this stage, data bus BS4 is supplied with data {{Kc//AC2}Kcom//license ID//content ID//AC1}Km(1), which can be decrypted with private decryption key Km(1) held in Km(1) holding portion 1421. This data {{Kc//AC2}Kcom//license ID//content ID//AC1}Km(1) is recorded in memory 1415 (step S144).

Further, decryption processing portion 1422 performs the decryption with private decryption key Km(1) unique to memory card 112 so that license ID, contethat license ID, content ID and access control information AC1 are recorded in license information holding portion 1440 via data bus BS4 (step S148).

Further, license ID, content ID and access restriction information AC1 are recorded in license information holding portion 1440 (step S150).

When the processing in and before step S150 is normally completed, cellular phone 100 sends a distribution request for the content data to distribution server 30 (step S152).

When distribution server 30 receives the distribution request for the content data, it obtains encrypted content data {Data}Kc and additional data Data-inf from information database 304, and outputs the data thus obtained via data bus BS1 and communication device 350 (step S154).

Cellular phone 100 receives {Data}Kc//Data-inf, and accepts encrypted content data {Data}Kc and additional information Data-inf (step S156). Encrypted content data {Data}Kc and additional information Data-inf are transmitted onto data bus BS3 of memory card 110 via memory interface 1200 and terminal 1202. In memory card 110, encrypted content data {Data}Kc and additional information Data-inf thus received are recorded in memory 1415 as they are (step S158).

Memory card 110 sends a notification of distribution acceptance to distribution server 30 (step S160). When distribution server 30 receives the distribution acceptance (step S162), storage of accounting data in accounting database 302 and other processing for ending the distribution are executed (step S164) so that the whole processing ends (step S170).

Cellular phone 100 starts the reproduction initialization session in the reproduction processing. Processing after this start is the same as that in the reproduction initialization session shown in FIG. 6. Steps S172, S176, S174, S178 and S180 correspond to steps S202, S204, S206, S208 and S210, respectively.

As described above, cellular phone 100 in the distribution session operates in such a manner that the reproduction initialization session is executed for the reproduction immediately after the completion of recording of the distributed content data, and thereby the reproduction initialization session is ended before input of reproduction via touch key unit 1108. Thereby, the reproduction of the content data and music can be started quickly in response to the reproduction request of the user, while keeping an intended security level.

Further, the content data can be distributed in response to the distribution request only after confirming the validities of public encryption keys Kp(1) and Kmc(1), which are sent from the content reproducing portion of cellular phone 100 and memory card 110, respectively. Therefore, distribution to unauthorized devices can be inhibited. Further, encryption for sending and receiving the data uses the key depending on the receiving side. Therefore, an intended security level in the distribution is ensured.

[Transferring Operation]

Description will now be given on the processing for transferring the content data between the two memory cards.

Figure 11:
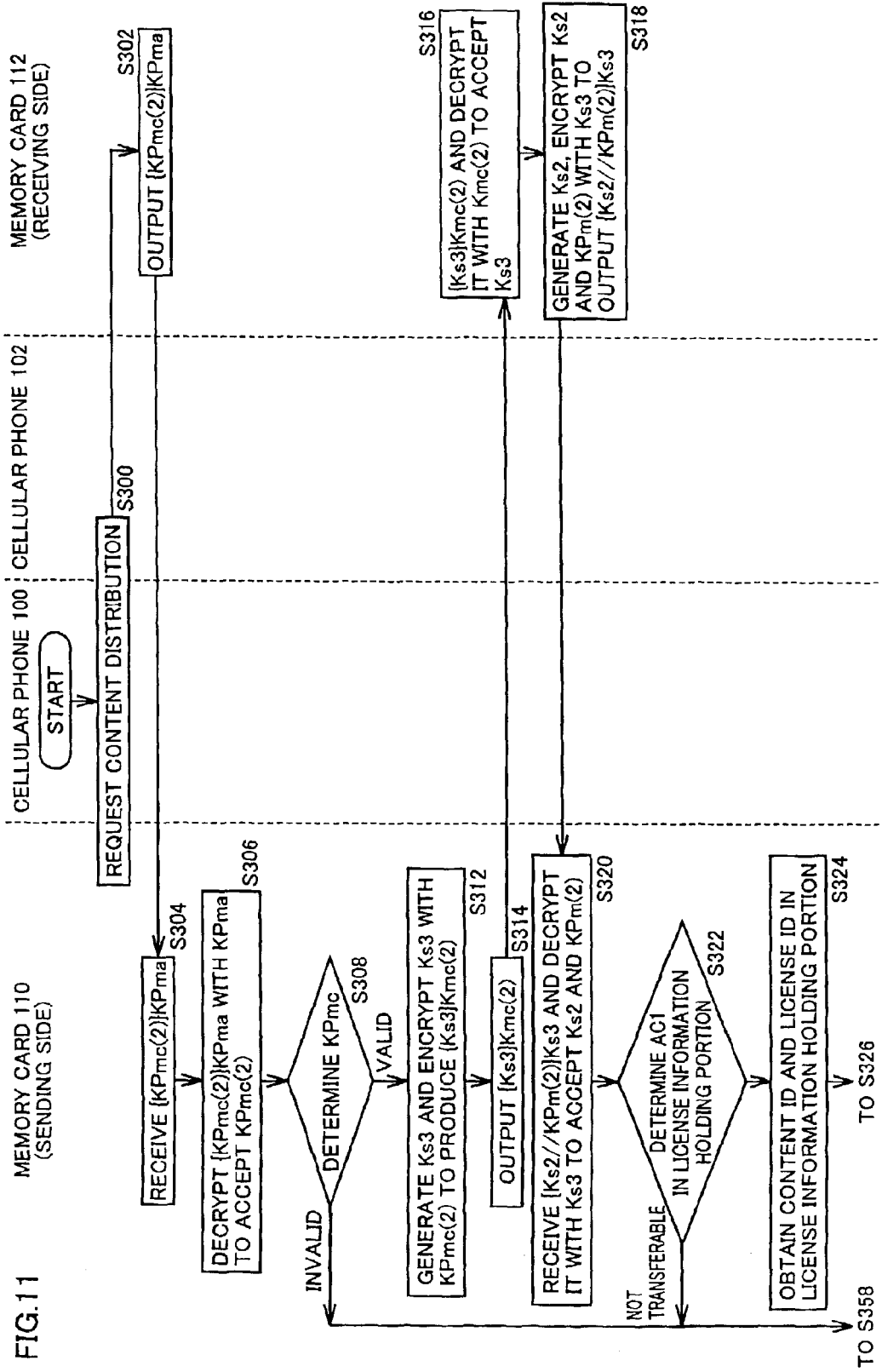
FIG. 11 is a first flowchart representing a transfer operation for transfer between two memory cards according to the first embodiment.
Figure 12:
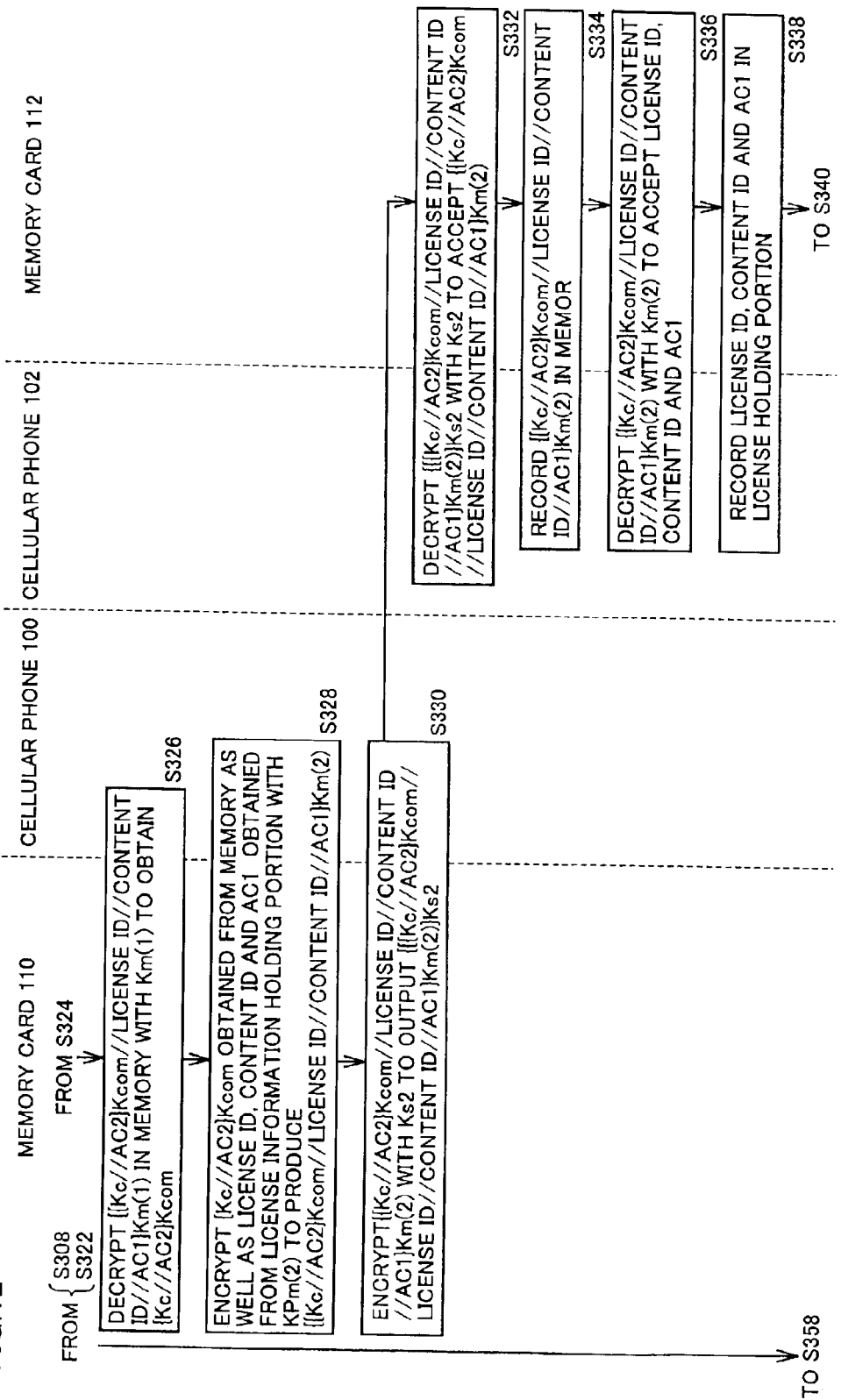
FIG. 12 is a second flowchart representing the transfer operation for transfer between the two memory cards according to the first embodiment.
Figure 13:
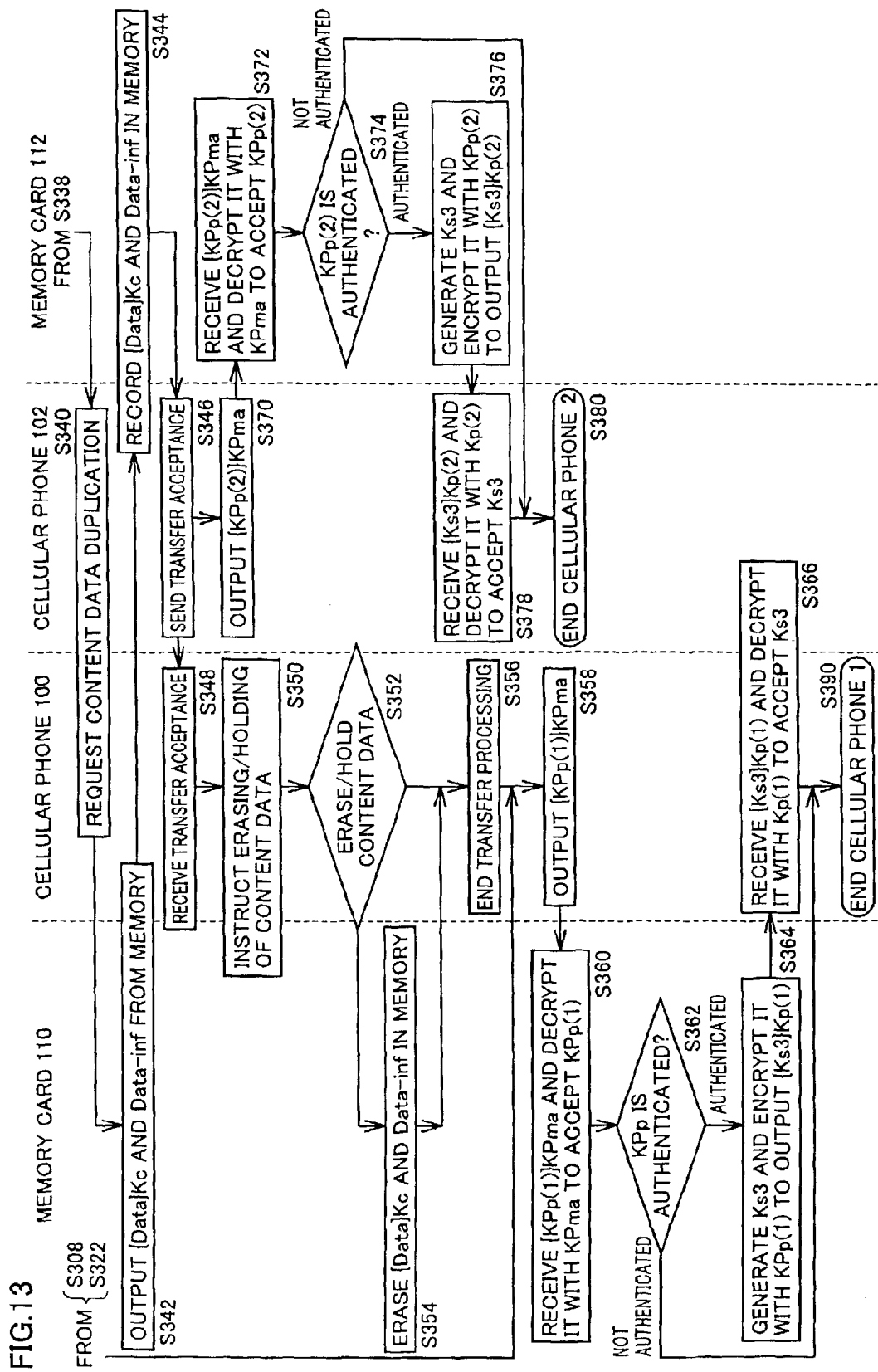
FIG. 13 is a third flowchart representing the transfer operation for transfer between the two memory cards according to the first embodiment.

FIGS. 11, 12 and 13 are first, second and third flowcharts representing the transference of the content data, keys and others between two memory cards 110 and 112 via cellular phones 100 and 102.

In FIGS. 10–12, the natural numbers n, which represent the kinds of cellular phone 100 and memory card 102, respectively, are both equal to one. Also, the natural numbers n, which represent the kinds of cellular phone 102 and memory card 112, respectively, are both equal to two. Natural numbers i used for identifying memory cards 110 and 112 are equal to one and two (i=1 and i=2), respectively.

In FIGS. 10–12, cellular phone 100 and memory card 110 are on the sending side, and cellular phone 102 and memory card 112 are on the receiving side. Memory card 112 has substantially the same structure as memory card 110, and is attached to cellular phone 102. In the following description, respective components and portions of memory card 112 bear the same reference numbers as those of memory card 110.

Referring to FIG. 10, user 1 on the sending side applies a content transfer request via cellular phone 100 of user 1, e.g., by operating keys or buttons on touch key unit 1108 (step S300).

The transfer request thus produced is transmitted to memory card 112 of user 2 on the receiving side via cellular phone 120. In memory card 112, authentication data holding portion 1500 outputs authentication data {KPmc(2)}KPma including public encryption key KPmc(2) corresponding to memory card 112 (step S302).

Authentication data {KPmc(2)}KPma of memory card 112 is sent from cellular phone 102 of user 2 to cellular phone 100 of user 1, and is received by memory card 110 (step S304).

In memory card 110, decryption processing portion 1408 performs the decryption. If public encryption key KPmc(2) encrypted with authentication key KPma is regularly registered and is regularly encrypted, i.e., when the data can be decrypted with authentication key KPma, and the belonging data produced by the decryption can be authenticated, decrypted public encryption key KPmc(2) is accepted as the public encryption key of memory card 112. If the decryption is impossible, or when the belonging data produced by the signal processing cannot be authenticated, the obtained data is not accepted (step S306).

When decryption processing portion 1408 accepts public encryption key KPmc(2) unique to the contents of memory card 112, controller 1420 determines that public encryption key KPmc(2) sent thereto is the public encryption key assigned to the memory card authenticated in this data distribution system, and the processing moves to a next step S312 (step S308). If not accepted, controller 1420 determines that invalid access is made by an unauthorized device, and ends the processing (step S360).

When the authentication result is valid, controller 1420 instructs session key generating portion 1418 to output session key Ks3 generated on the sending side in the transfer session. On the receiving side in the transfer session, session key generating portion 1418 of memory card 110 generated the new session key so that session key Ks3 held in the reproduction initialization session is rewritten into session key Ks2. Session key Ks3 produced by session key generating portion 1418 is transmitted to encryption processing portion 1410. Encryption processing portion 1410 further receives public encryption key KPmc(2) of memory card 112, which is decrypted by decryption processing portion 1408 in step S306, and encrypts session key Ks3 with public encryption key KPmc(2). Thereby, encrypted session key {Ks3}Kmc(2) is output onto data bus BS3 (step S314).

Encrypted session key {Ks3}Kmc(2) is transmitted to memory card 112 via memory interface 1200, cellular phone 100 and cellular phone 102.

Memory card 112 receives encrypted key {Ks3}Kmc(2) sent from memory card 110, and decrypts it by decryption processing portion 1404 with private decryption key Kmc(2) corresponding to memory card 112 to accept session key Ks3 produced by memory card 110 on the sending side (step S316).

In response to acceptance of session key Ks3, controller 1420 of memory card 112 instructs session key generating portion 1418 to produce session key Ks2, which is to be generated on the receiving side in the transfer session. On the receiving side in the transfer session, session key generating portion 1418 of memory card 110 generated the new session key so that session key Ks3 held in the reproduction initialization session is rewritten into session key Ks2. Session key Ks2 produced thereby is transmitted to encryption processing portion 1406 via a contact Pf in select switch 1446 and a contact Pc in select switch 1444.

Encryption processing portion 1406 receives session key Ks3 obtained by decryption processing portion 1404 in step S316, and encrypts session key Ks2 and public encryption key KPm(2), which are obtained via contact Pc in select switch 1444 by appropriately selecting contacts Pf and Pe in select switch 1446, with session key Ks1, and outputs {Ks2//KPm(2)}Ks3 onto data bus BS3 (step S318).

Encrypted data {Ks2//KPm(2)}Ks3 output onto data bus BS3 is transmitted onto data bus BS3 of memory card 110 via cellular phones 102 and 100.

In memory card 110, decryption processing portion 1412 decrypts the encrypted data transmitted onto data bus BS3 with session key Ks3, and accepts session key Ks2 and public encryption key KPm(2) related to memory card 112 (step S320).

In accordance with the acceptance of session key Ks2 and public encryption key KPm(2), controller 1420 in memory card 110 determines the access restriction information AC1 in license information holding portion 1440 (step S322). When it is determined from access control information AC1 that transfer of license is impossible, the transfer is stopped at this stage (step S360).

When it is determined from access restriction information AC1 that the transfer session is allowed, the processing moves to next step S322, and controller 1420 obtains the corresponding content ID and license ID from license information holding portion 1440, updates the access restriction information in license information holding portion 1440, and records the inhibition of subsequent reproduction and transfer (step S324). In response to this, access restriction information AC1 is determined in each of the reproduction session and the transfer session, and processing is performed to inhibit the subsequent reproduction session and the subsequent transfer session.

Controller 1420 instructs memory 1415 to output encrypted data {{Kc//AC2}Kcom//license ID//content ID//AC1}Km(1) relating to session key Kc and reproduction information corresponding to the content to be transferred. Encrypted data {{Kc//AC2}Kcom//license ID//content ID//AC1}Km(1) output from memory 1415 is decrypted so that {Kc//Ac2}Kcom is obtained on data bus BS4 (step S326).

The license ID, content ID and access restriction information AC1, which are obtained from license information holding portion 1440 in step S324, and {Kc//Ac2}Kcom obtained in step S326 are taken into encryption processing portion 1424 via data bus BS4, and is encrypted. Encryption processing portion 1424 encrypts these received data with public encryption key KPm(2), which is obtained by decryption processing portion 1412 in step S320, and is unique to memory card 112, to produce {{Kc//AC2}Kcom//license ID//content ID//AC1}Km(2) (step S328).

Encrypted data {{Kc//AC2}Kcom//license ID//content ID//AC1}Km(2), which is output onto data bus BS4, is transmitted to encryption processing portion 1406 via contact Pd of select switch 1444. Encryption processing portion 1406 receives session key Ks2, which was prepared by memory card 112 and is obtained by decryption processing portion 1412, via contact Pb of select switch 1442, and encrypts the data received from contact Pd with session key Ks2.

Encryption processing portion 1406 outputs data {{{Kc//AC2}Kcom//license ID//content ID//AC1}Km(2)}Ks2 onto data bus BS3 (step S330). In step S330, the encrypted data output onto data bus BS3 is transmitted to memory card 112, which is on the receiving side in the transfer session, via cellular phones 100 and 102.

In memory card 112, decryption processing portion 1412 performs the decryption with session key Ks2 produced by session key generating portion 1418, and accepts {{{Kc//AC2}Kcom//license ID//content ID//AC1}Km(2) (step S332).

Data {{Kc//AC2}Kcom//license ID//content ID//AC1}Km(2) thus accepted is recorded while keeping a form encrypted with public encryption key KPm(2) (step S334).

Further, decryption processing portion 1422 performs decryption with private decryption key Km(2) unique to memory card 112 so that license ID, content ID and access restriction information AC1 are accepted (step S336).

The license ID, content ID and access restriction information AC1 thus accepted are recorded in license information holding portion 1440 (step S338).

When the processing in and before steps 338 are normally completed in the foregoing manner, a request for duplication of the content data is further issued via cellular phone 102 in response to the transfer of the encrypted data of license key Kc and the distribution information (step S340).

The request for duplication of the content data is transmitted to memory card 110 via cellular phone 100. In response to this, corresponding encrypted content data {Data}Kc and additional information Data-inf are output from memory 1415 in memory card 110 onto data bus BS3 (step S342). These data output onto data bus BS3 are transmitted to memory card 112 via memory interface 1200, cellular phone 100 and cellular phone 102, and are recorded in memory 1415 in memory card 112 (step S344).

When recording of encrypted content data {Data}Kc and additional information Data-inf is completed, transfer acceptance is sent via cellular phone 102 (step S346).

When memory card 112 and corresponding cellular phone 102 normally execute the reproduction session in response to the above transfer acceptance, the user can listen to music via cellular phone 102 based on the content data recorded in memory card 112.

Cellular phone 100 on the sending side receives the transfer acceptance sent from cellular phone 102 (step S348), and receives an instruction from the user via touch key unit 1108 to either erase or hold the content data (step S350).

When erasing of the content data is instructed via touch key unit 1108, corresponding encrypted content data {Data}Kc and additional information Data-inf are erased in memory 1415 within memory card 110 (step S354). When holding of the content data is instructed, step S354 is skipped, and the transfer processing ends in this stage (step S356).

After the transfer session was normally performed and transfer processing ending step S356 is performed, or when processing is skipped after step S308 or S322 because the transfer session is stopped as a result of authentication or the like, the processing moves to a next step S358.

The reproduction information such as corresponding content ID recorded in license information holding portion 1440 is in the same state as the erasing because access restriction information AC1 was updated in step S324 to inhibit the reproduction session and the transfer session. When the bank storing the reproduction information in this state receives new reproduction information distributed or transferred thereto for new content data, overwriting is allowed. Therefore, similar effects can be achieved by erasing all the data in this bank.

In the state where the encrypted content data is already recorded in memory 1415, the encrypted content data can be reproduced for listening to the music only by accessing distribution server 30 and receiving the distributed reproduction information. The processing of distributing only the reproduction information is not represented in the flowcharts. However, this processing is substantially the same as the processing in the distribution session shown in FIGS. 9 and 10 except for that the steps S152, S154, S156 and S158 relating to the sending and receiving of the encrypted content data are not performed, and therefore description thereof is not repeated.

When transfer processing ends in step S356, cellular phone 100 outputs data [KPp(1)]KPma for authentication to memory card 110 (step S358).

Memory card 110 receives data [KPp(1)]KPma from cellular phone 100, and decryption processing portion 1408 decrypts it with key KPma so that key KPp(1) is accepted (step S360).

In memory card 110, controller 1420 authenticates cellular phone 100 based on key KPp(1) thus accepted (step S362).

When the transfer ending processing is performed in step S356, cellular phone 100 starts the reproduction initialization session between memory card 110 and cellular phone 100. Subsequent steps S358, S360, S362, S364 and S366 correspond to steps S202, S204, S206, S208 and S210 in FIG. 6, respectively, so that description thereof is not repeated. When cellular phone 100 completes reproduction initialization session, it ends the processing (step S390).

When cellular phone 102 sends the transfer acceptance in step S346, cellular phone 102 starts the reproduction initialization session between memory card 110 and cellular phone 102. Subsequent steps S348, S350, S352, S354 and S356 correspond to steps S202, S204, S206, S208 and S210 in FIG. 6, respectively, so that description thereof is not repeated. When cellular phone 102 completes reproduction initialization session, it ends the processing (step S390).

As described above, cellular phone 100 on the sending side and cellular phone 102 on the receiving side in the transfer session operate in such a manner that the reproduction initialization session is executed for the reproduction immediately after the completion of sending/receiving of the transferred content data, and thereby the reproduction initialization session is ended before instruction of reproduction via touch key unit 1108 of each cellular phone. Thereby, the reproduction of the content data and music can be started quickly in response to the reproduction request of the user, while keeping an intended security level.

Further, memory card 110 on the sending side transfers the reproduction information including the license key in response to the transfer request only after confirming the validity of public encryption key Kmc(2), which is sent from memory card 112 on the receiving side. Therefore, transfer to an unauthorized memory card can be inhibited. Further, encryption for sending and receiving the data uses the key depending on the receiving side. Therefore, an intended security level in the transfer session is ensured.

[Second Embodiment]

A data distribution system of a second embodiment differs from the data distribution system of the first embodiment in the following points. Data {{Kc//AC2}Kcom//license ID//content ID//AC1}Km(1) of the encrypted license key and others is prepared by encrypting the encrypted license key and others with public encryption key Km(1) in the public key cryptosystem using encryption and encryption keys, which are asymmetrical to each other, and is distributed. The data thus distributed is decrypted with key Km(1), and then is stored in memory 1415 after being encrypted again with a symmetric key, i.e., private symmetric key K(i) unique to the memory card.

Thus, the data distribution system of the second embodiment differs from that of the first embodiment in that memory card 114 is employed instead of memory card 110 employed in the data distribution system of the first embodiment and already described with reference to FIG. 5.

FIG. 14 represents characteristics of data, information and others used for communication in the data distribution system of the second embodiment, and corresponds to FIG. 2 representing the first embodiment. However, the characteristics in FIG. 14 differ from those in FIG. 2 only in that the symmetric key, i.e., private symmetric key K(i) unique to the memory card is employed as already described, and therefore description thereof is not repeated.

Figure 15:
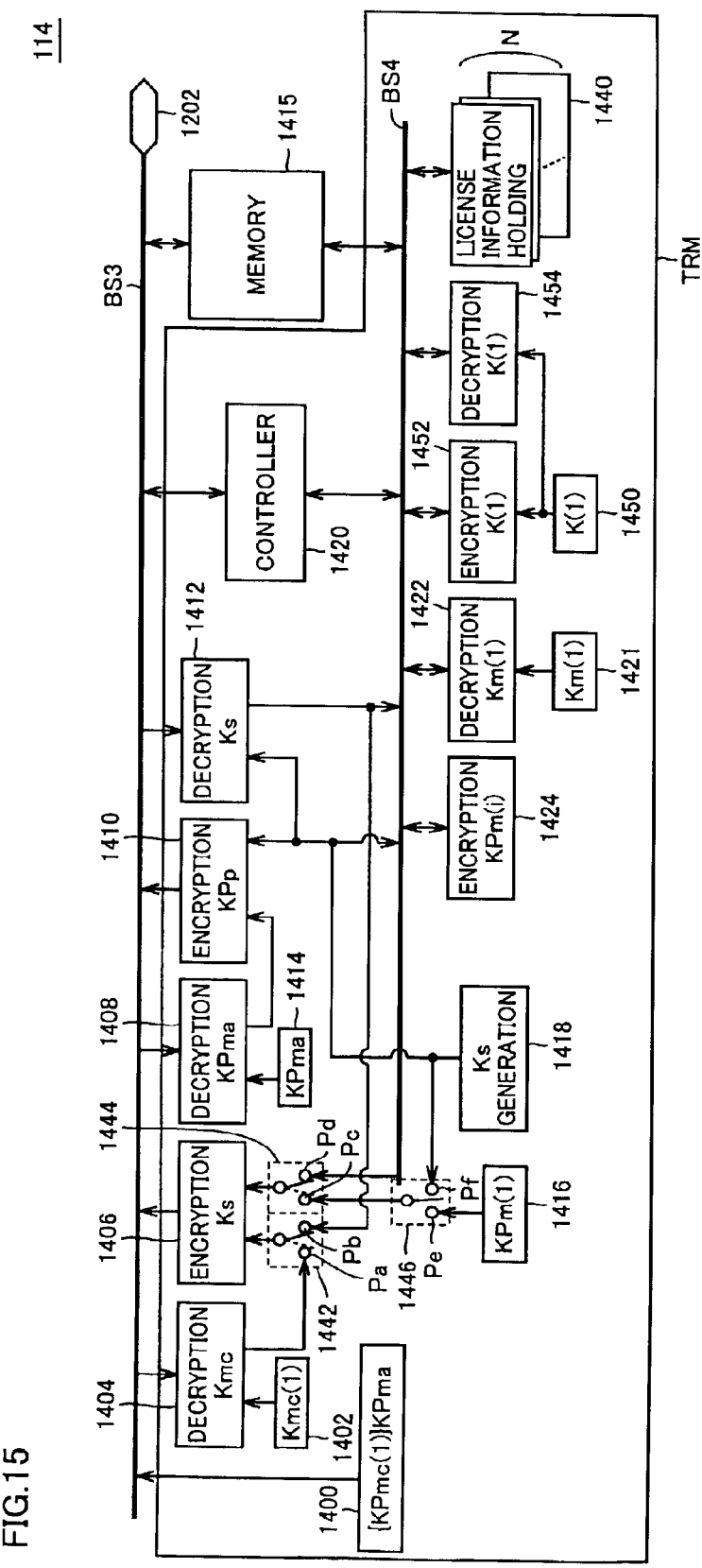
FIG. 15 is a schematic block diagram showing a structure of a memory card 114 of the second embodiment.

FIG. 15 is a block diagram showing a structure of a memory card 114 of the second embodiment, and corresponds to FIG. 5 showing the first embodiment.

Referring to FIG. 15, memory card 114 differs from memory card 110 of the first embodiment shown in FIG. 5 in that memory card 114 includes a K(1) holding portion 1450 for holding private symmetric key K(1) unique to the memory card, an encryption processing portion 1452 for encrypting the data on data bus BS4 with private symmetric key K(1), and a decryption processing portion 1454 for decrypting the data on data bus BS4 with private symmetric key K(1).

Structures other than the above are substantially the same as those of memory card 110 of the first embodiment. The same portions bear the same reference numbers, and description thereof is not repeated.

Figure 16:
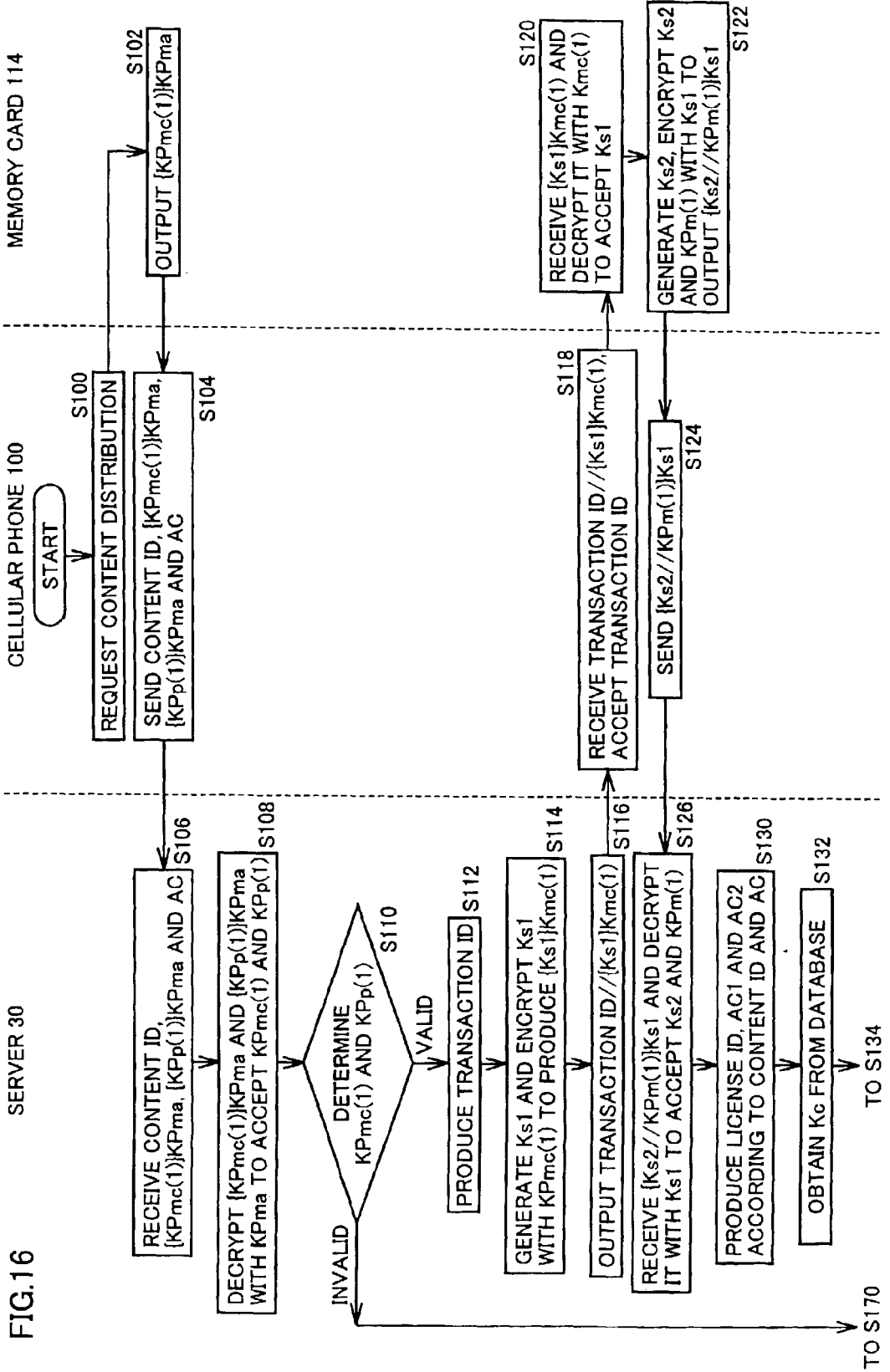
FIG. 16 is a first flowchart representing a distributing operation performed when purchasing contents in the data distribution system according to the second embodiment.
Figure 17:
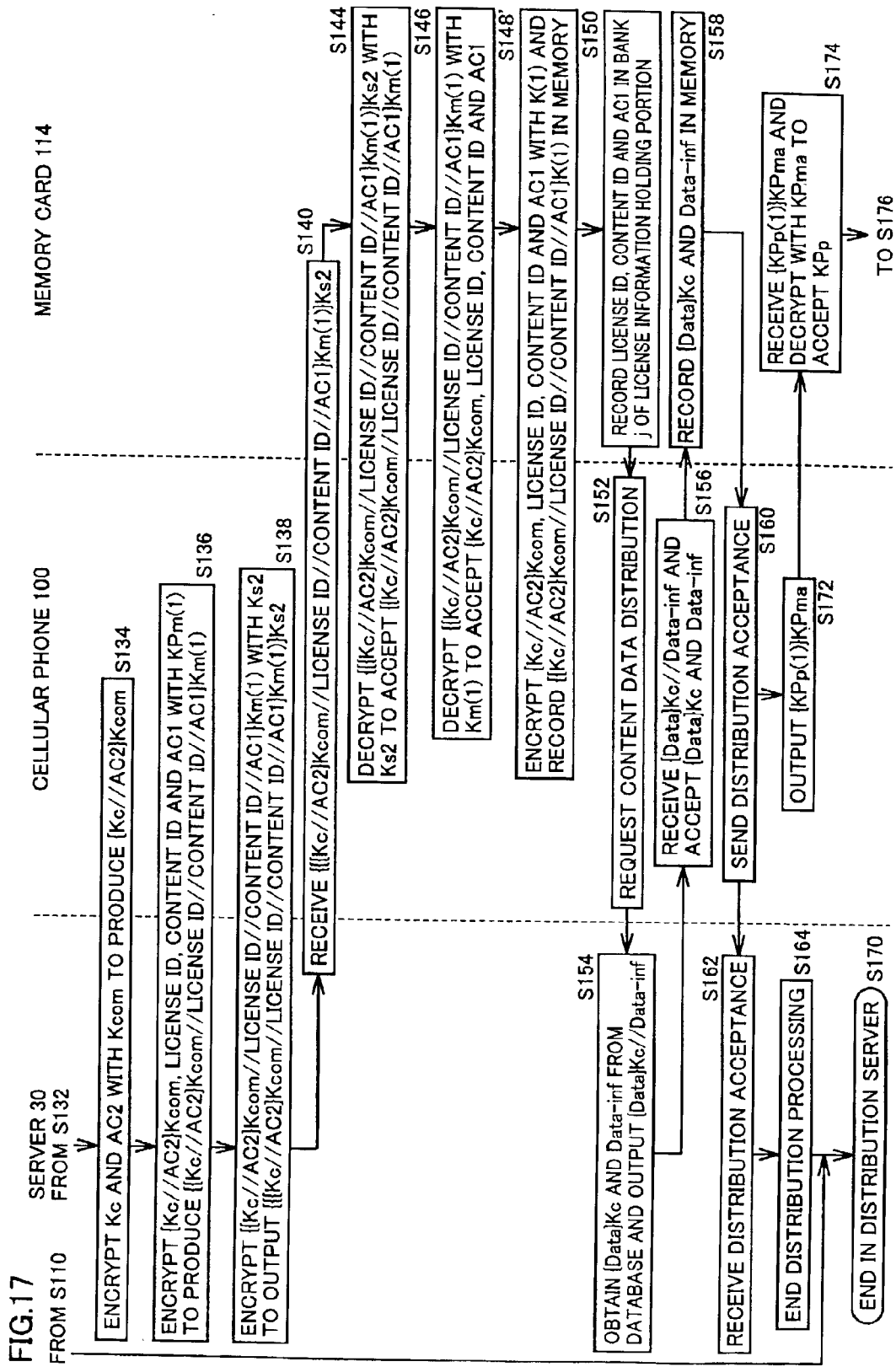
FIG. 17 is a second flowchart representing the distributing operation performed when purchasing contents in the data distribution system according to the second embodiment.
Figure 18:
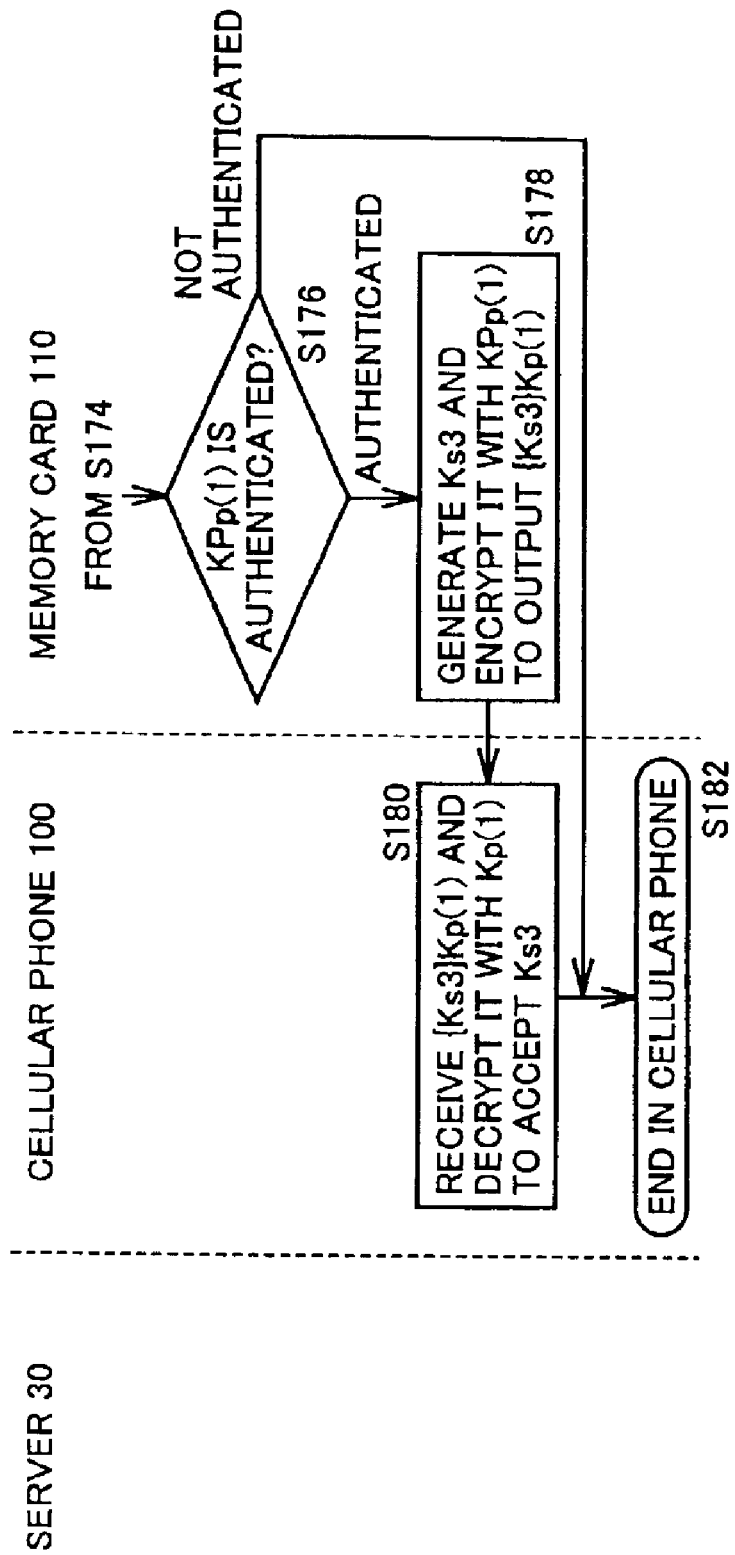
FIG. 18 is a third flowchart representing the distributing operation performed when purchasing contents in the data distribution system according to the second embodiment.

FIGS. 16, 17 and 18 are first, second and third flowcharts representing the distribution operation performed for purchasing contents in the data distribution system according to the second embodiment, and correspond to FIGS. 8, 9 and 10 representing the first embodiment, respectively.

FIGS. 16–19 represent the operations, in which user 1 uses memory card 114 for receiving the content data distributed from distribution server 30 via cellular phone 100.

The processing represented in FIGS. 16–18 differs from the distribution processing using memory card 110 in the following points. In step S144, memory card 114 accept data {{Kc//AC2}Kcom//license ID//content ID//AC1}Km(1), and decryption processing portion 1422 decrypts {{Kc//AC2}Kcom//license ID//content ID//AC1}Km(1) with private decryption key Km(1) in accordance with an instruction from controller 1420 so that data {Kc//AC2}Kcom, license ID, content ID and access restriction information AC1 are accepted (step S146'). The data {Kc//AC2}Kcom, license ID, content ID and access restriction information AC1 thus accepted are encrypted by encryption processing portion 1452 with private symmetric key K(1) unique to memory card 114, and {{Kc//AC2}Kcom//license ID//content ID//AC1}K(1) is recorded in memory 1415 outside the TRM region (step S148').

According to the above distribution processing, data {Kc//AC2}Kcom, license ID, content ID and access restriction information AC1 are decrypted with private decryption key Km(1) in step S146, and then are encrypted again with private symmetric key K(1) before recording in memory 1415 in step S148. These manners are employed for the following reasons.

According to the public key cryptosystem using asymmetric keys, i.e., according to a combination of public encryption key KPm(1) and private decryption key Km(1), a long time may be required for the decryption processing.

Therefore, the data is encrypted again with private symmetric key K(1), which is unique to the memory card, in the symmetric key cryptosystem allowing fast decryption. Thereby, decryption of license key Kc and reproduction restriction information AC1, which are information required for the reproduction, can be performed rapidly in the processing of reproducing the content data corresponding to the encrypted content data.

Further, the key for data sending is different from the key for storing the data in the memory card. Such different keys improve the security level.

The public key cryptosystem described above may be specifically a RAS cryptosystem (Rivest-Shamir-Adleman cryptosystem), elliptic curve cryptosystem or the like, and the symmetric key cryptosystem may be specifically a DES (Data Encryption Standard) cryptosystem or the like.

Description has been given on the structure, in which the data encrypted based on keys KPm(1)/Km(1) in the public key cryptosystem, which uses the encryption and decryption keys asymmetric to each other, is re-encrypted with private symmetric key K(1) in the symmetric key cryptosystem using the encryption and decryption keys, which are entirely symmetric to each other. However, another structure may be employed. For example, such a structure may be employed that license ID, content ID and access restriction information AC1, which are held in license information holding portion 1440 provided within the TRM region of memory card 110, are neither re-encrypted nor stored in memory 1415, and data {Kc//AC2}Kcom are recorded in memory 1415 after being re-encrypted with symmetric private key K(1).

Operations other than the above are substantially the same as the distribution operations in the first embodiment. The same steps and operations bear the same reference numbers, and description thereof is not repeated.

Figure 19:
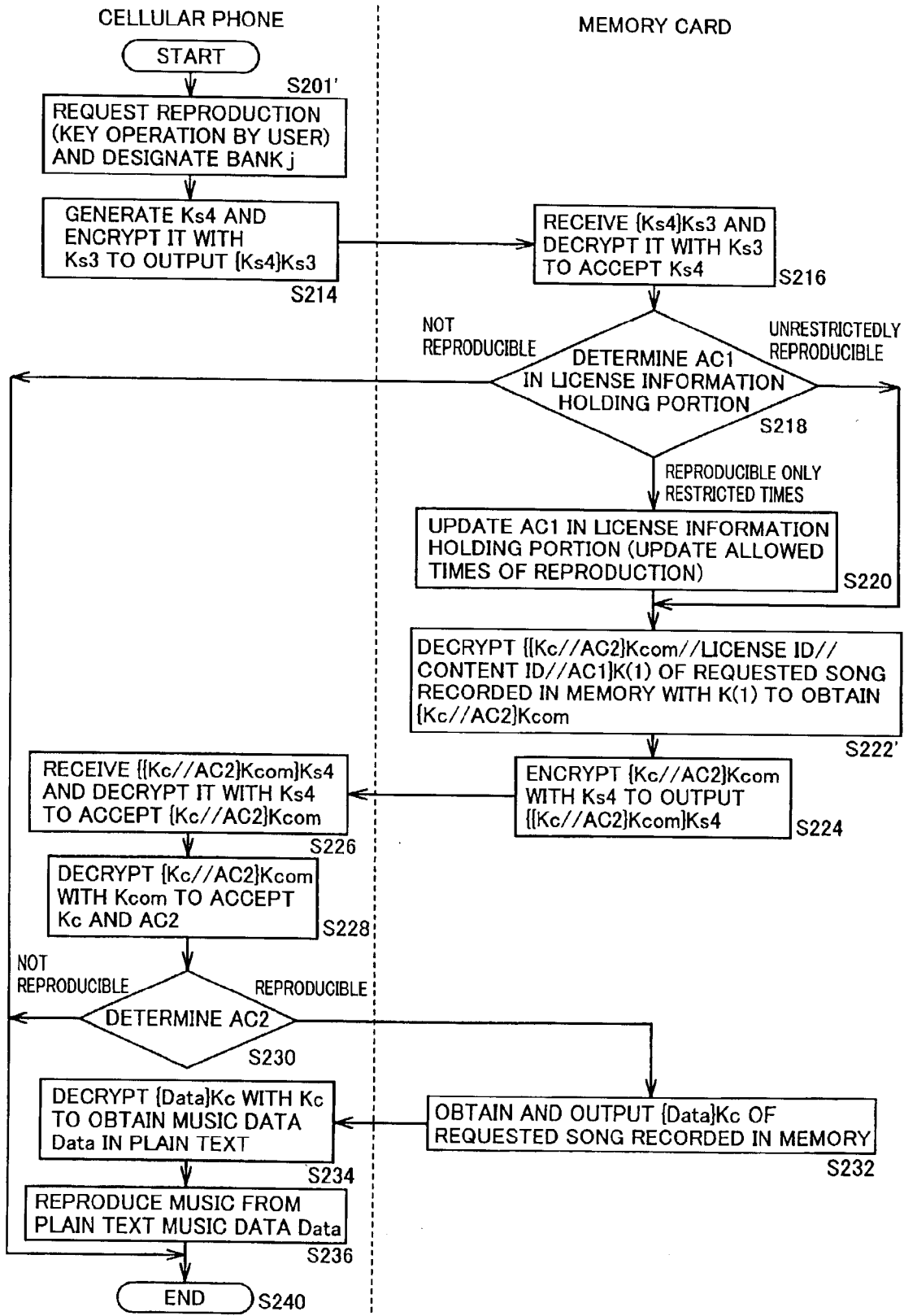
FIG. 19 is a flowchart representing operations of various portions in the reproduction session of a system using a memory card of the second embodiment.

FIG. 19 is a flowchart representing operations of various portions in the reproduction session using memory card 114 in the second embodiment;

According to memory card 114 in the second embodiment, it is assumed that the processing for the reproduction initialization session is performed similarly to memory card 110 in the first embodiment.

The distribution processing using memory card 110 in the second embodiment differs from the distribution processing using memory card 110 in the first embodiment in that processing in a step S222' shown in FIG. 19 is performed such that encrypted data {{Kc//AC2}Kcom//license ID//content ID//AC1}K(1) read from memory 1415 onto data bus BS4 is decrypted by decryption processing portion 1454 with private key K(1) held in a K(1) holding portion 1451.

Operations other than the above are substantially the same as the distribution operations in the first embodiment. The same steps and operations bear the same reference numbers, and description thereof is not repeated.

[Transfer Operation]

FIGS. 20, 21 and 22 are first, second and third flowcharts representing operations for transfer in the second embodiment, respectively.

The transfer operations of the memory card in the second embodiment are basically the same as those in the first embodiment.

The operations for transfer between memory cards 114 and 116 in the second embodiment are different from the operations for transfer between memory cards 110 and 112 in steps S326', S334' and S336'. In step S326', controller 1420 instructs memory 1415 to output session key Kc corresponding to the contents to be transferred and encrypted data {{Kc//AC2}Kcom//license ID//content ID//AC1}K(1) relating to the reproduction information. Encrypted data {{Kc//AC2}Kcom//license ID//content ID//AC1}K(1) output from memory 1415 is decrypted by decryption processing portion 1454 with private symmetric key K(1) to obtain {Kc//AC2}Kcom on data bus BS4.

In step S334', {{Kc//AC2}Kcom//license ID//content ID//AC1}Km(2) accepted in step S332 is decrypted by decryption processing portion 1422 with private decryption key Km(2) unique to memory card 116 so that {Kc//AC2}Kcom, license ID, content ID and access restriction information AC1 are output onto data bus BS4.

In step S336', {Kc//AC2}Kcom, license ID, content ID and access restriction information AC1 output onto data bus BS4 in step S334' are encrypted again by encryption processing portion 1452 with private symmetric key K(2), and then are recorded in memory 1415 via data bus BS4.

Operations other than the above are substantially the same as the transfer operations in the first embodiment. The same steps and operations bear the same reference numbers, and description thereof is not repeated.

Owing to the above structure, the reproduction can be started more quickly, and the security of the content data can be enhanced.

The processing in the first embodiment differs from that in the second embodiment only in the processing within the memory card, and there is no difference in encryption of the data outside the memory card between the first and second embodiments. The transfer operations can be performed by employing any combination of those on the sending and receiving sides in the first and/or second embodiments already described.

Accordingly, memory cards 110 and 114 are compatible with each other.

[Third Embodiment]

A data distribution system of the third embodiment differs from that of the first embodiment in that the distribution server and the content reproducing circuit of the cellular phone do not perform the encryption and decryption processing with secret key Kcom common to the content reproducing circuit.

The data distribution system of the third embodiment differs from the data distribution system of the first embodiment already described with reference to FIG. 3 in that a license server 11 is employed instead of license server 10 in distribution server 30 provided in the data distribution system of the first embodiment. Further, the data distribution system of the third embodiment employs a cellular phone 103 instead of cellular phone 100 already described with reference to FIG. 4.

FIG. 23 represents characteristics of data, information and others used for communication in the data distribution system of the third embodiment, and corresponds to FIG. 2 representing the first embodiment. The characteristics in FIG. 23 differ from those in FIG. 2 only in that secret key Kcom is not employed, and therefore description thereof is not repeated.

Figure 24:
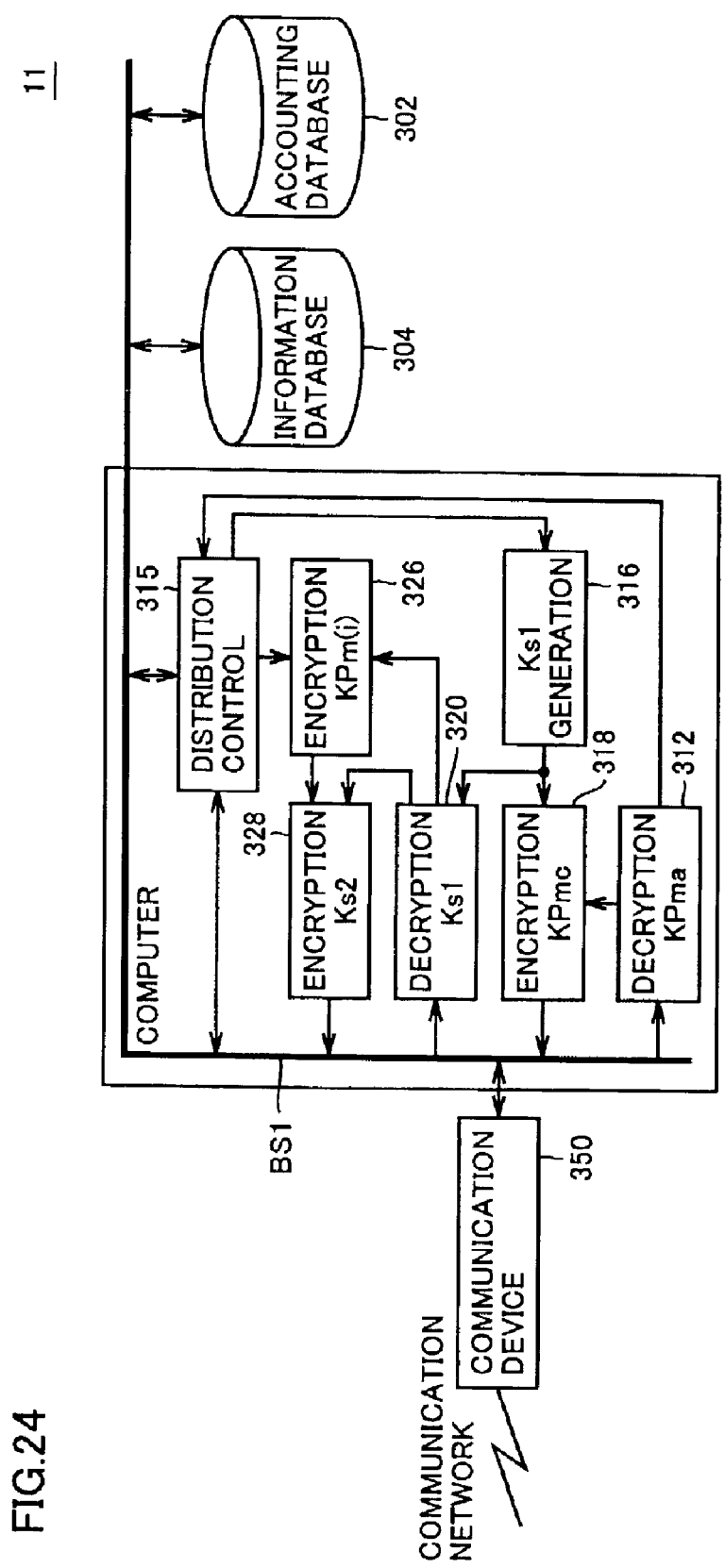
FIG. 24 shows a structure of a license server 11 according to the third embodiment.

FIG. 24 is a schematic block diagram showing a structure of a license server 11 in the data distribution system according to the third embodiment.

License server 11 differs from license server 10 in that license server 11 employs neither Kcom holding portion 322 for secret key Kcom common to the reproducing circuit nor encryption processing portion 324 for performing encryption with secret key Kcom. In distribution server 31, license key Kc and reproducing circuit control information AC2 output from distribution control portion 315 are directly transmitted to encryption processing portion 326. Circuit structures and operations other than the above are substantially the same as those of license server 10 shown in FIG. 3, and therefore, description thereof is not repeated.

License server 11, authentication server 12 and distribution carrier 20 may be collectively referred to as "distribution server 31".

Figure 25:
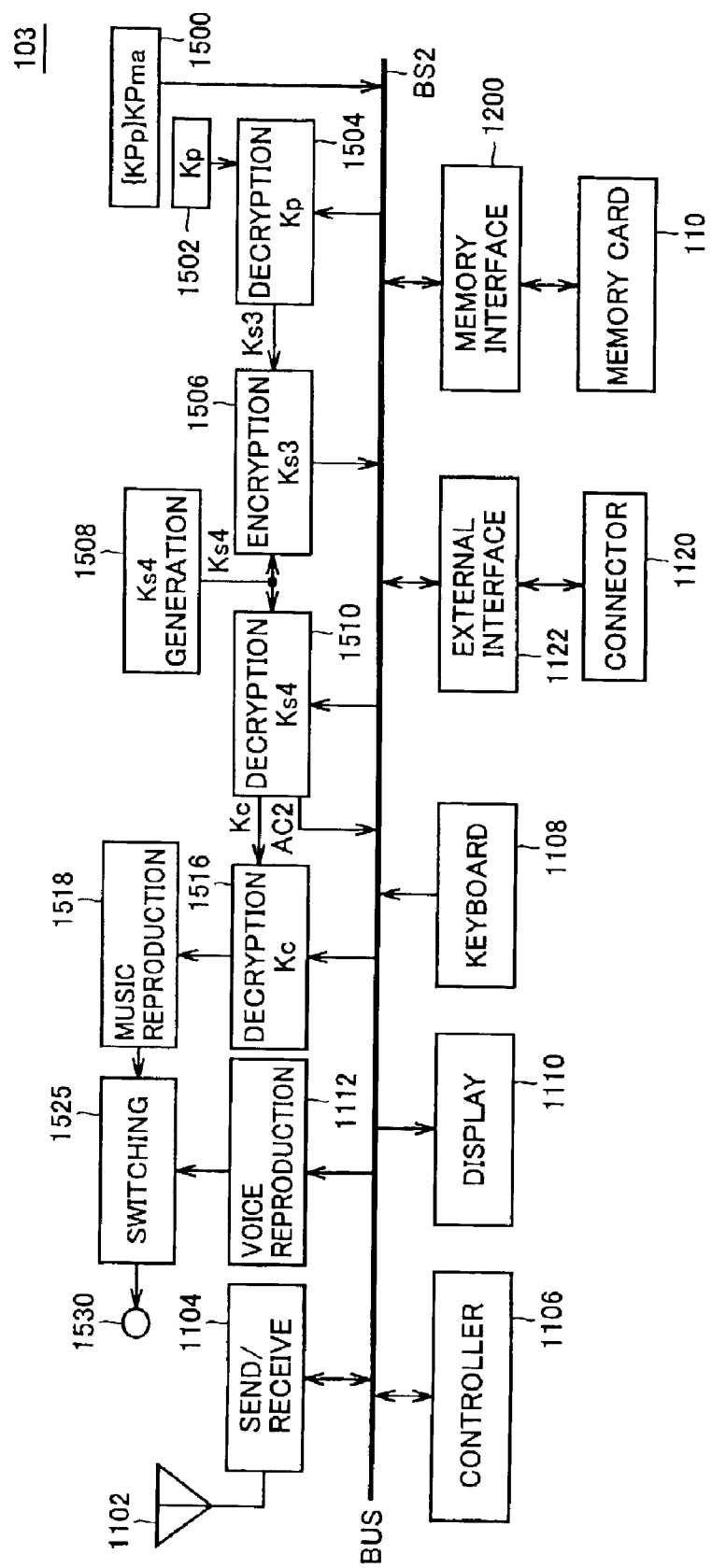
FIG. 25 is a schematic block diagram showing a structure of a cellular phone 103.

FIG. 25 is a schematic block diagram showing a structure of cellular phone 103 used in the data distribution system according to the third embodiment.

Referring to FIG. 25, cellular phone 103 differs from cellular phone 100 in the first embodiment already described with reference to FIG. 4 in that cellular phone 103 is not provided with Kcom holding portion 1512 for holding secret key Kcom common to the reproducing circuit and decryption processing portion 1514 using secret key Kcom.

Since distribution server 31 does not perform the encryption with secret key Kcom, license key Kc can be obtained directly by decryption processing portion 1510, which performs decryption with session key Ks4, so that license key Kc is directly applied to decryption processing portion 1510 according to cellular phone 103. Circuit structures and operations other than the above are substantially the same as those of cellular phone 100, and therefore, description thereof is not repeated.

The memory card used in the data distribution system according to the third embodiment has the same structure as memory card 110 shown in FIG. 5, and therefore, description thereof is not repeated.

By eliminating the encryption with secret key Kcom common to the reproducing circuit, a difference occurs in operations of each of the distribution session and reproduction session. This difference will now be described with reference to flowcharts.

Figure 26:
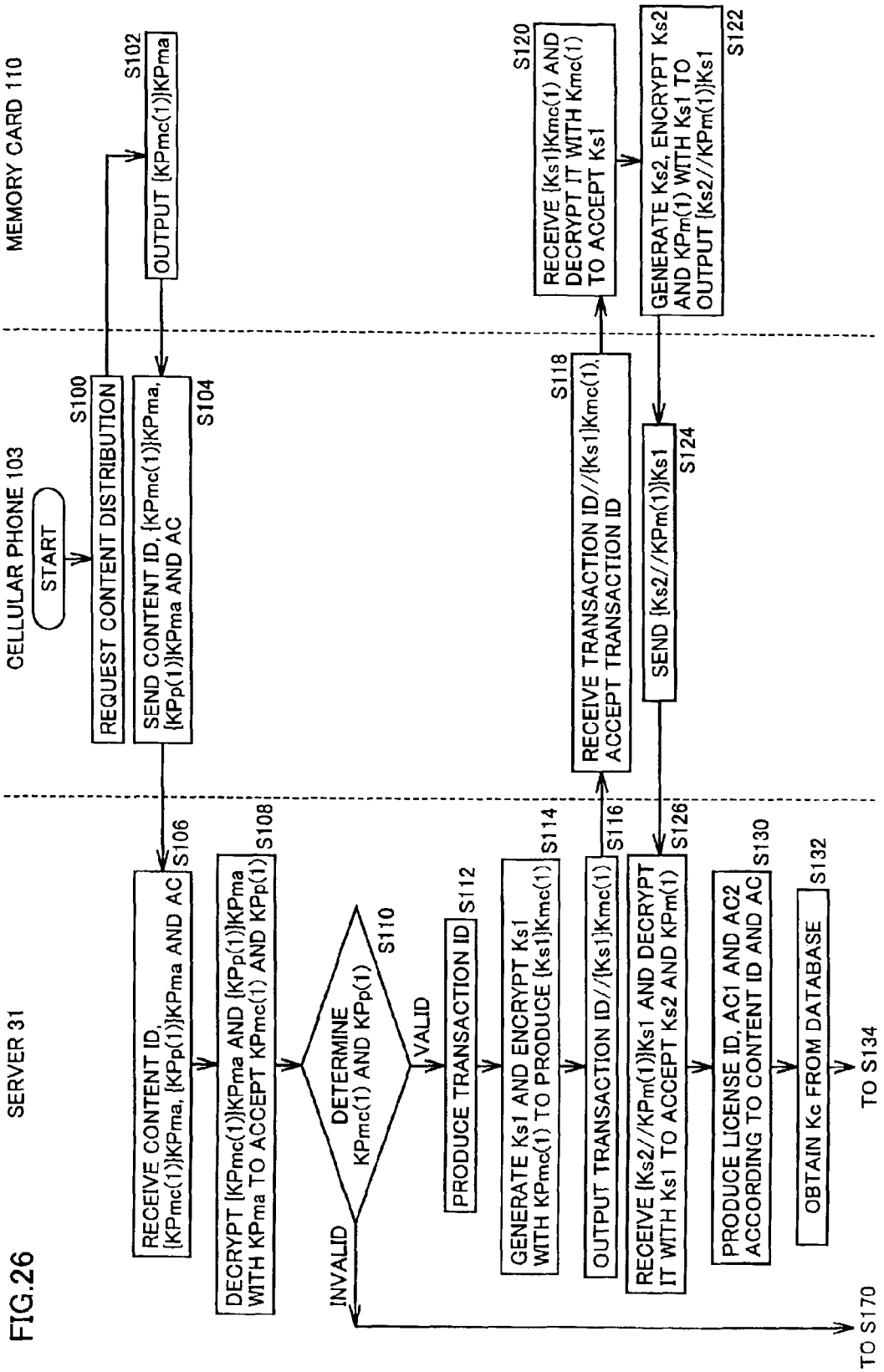
FIG. 26 is a first flowchart representing a distributing operation performed when purchasing contents in the data distribution system according to the third embodiment.
Figure 27:
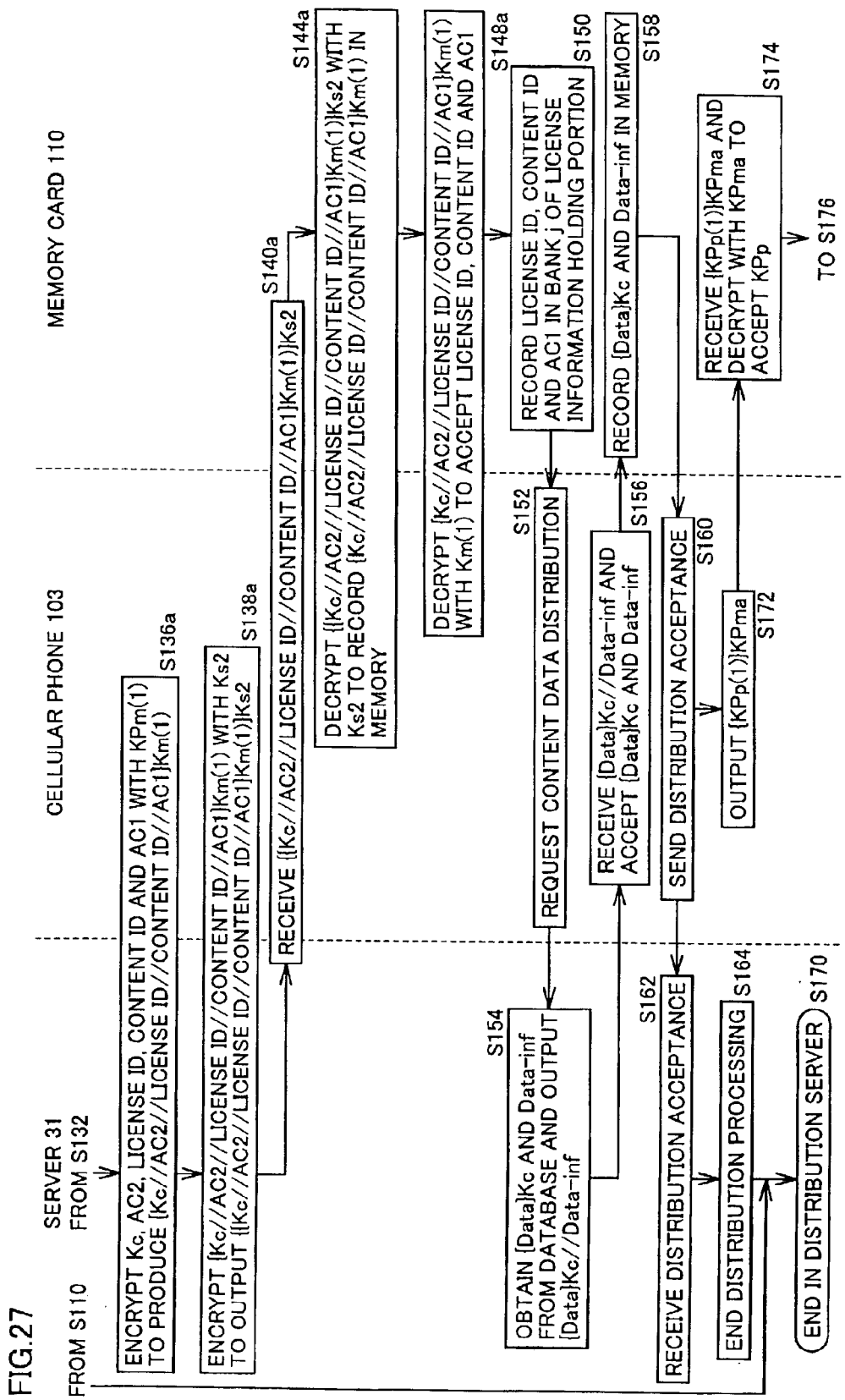
FIG. 27 is a second flowchart representing the distributing operation performed when purchasing contents in the data distribution system according to the third embodiment.
Figure 28:
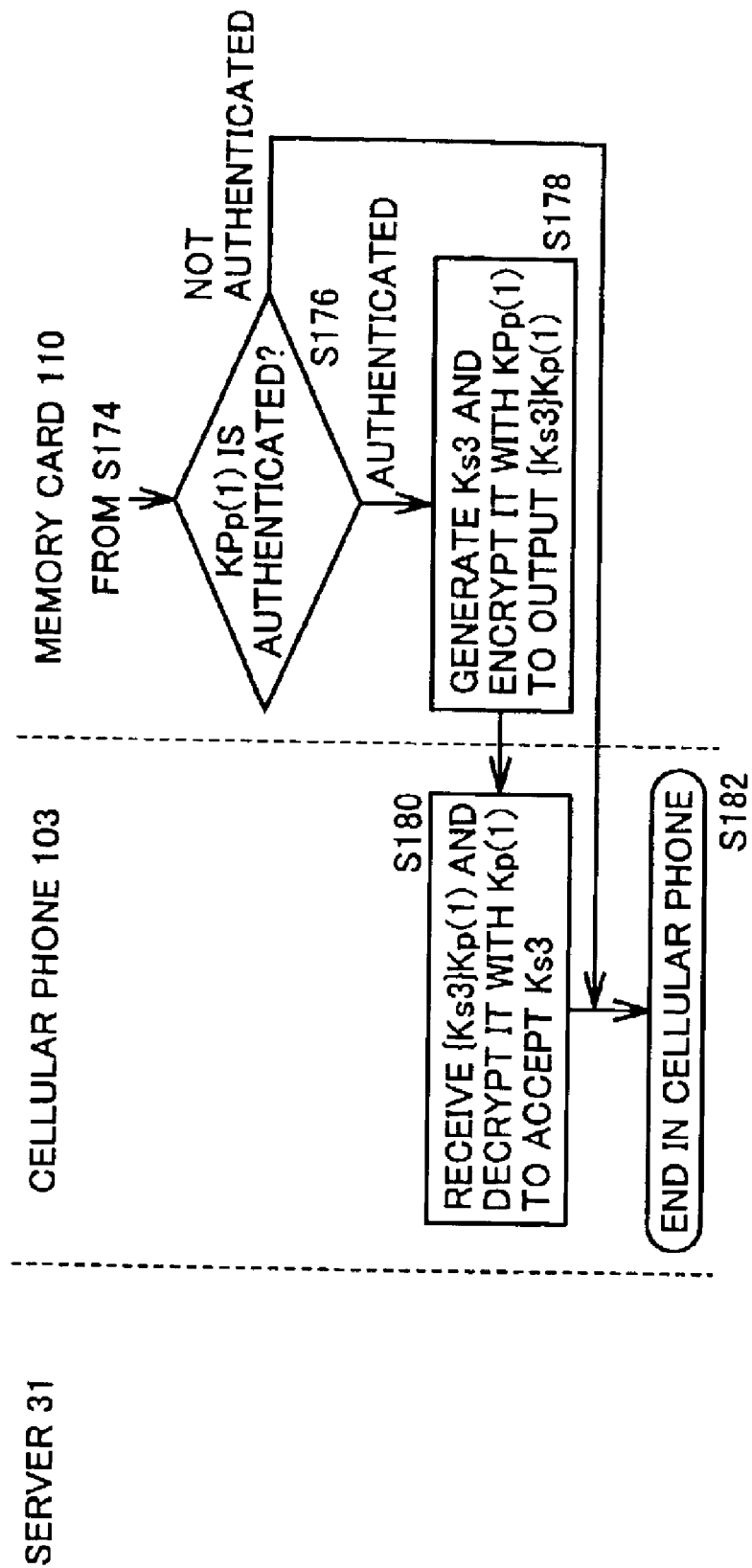
FIG. 28 is a third flowchart representing the distributing operation performed when purchasing contents in the data distribution system according to the third embodiment.

FIGS. 26, 27 and 28 are first, second and third flowcharts showing distribution operations in the data distribution system according to the third embodiment, respectively. With reference to FIGS. 26–28, description will now be given on only differences with respect to the distribution operations of the data distribution system of the first embodiment, which are already described with reference to the flowcharts of FIGS. 8 to 10.

Referring to FIGS. 26–28, processing in and before step S132 is the same as that in the flowchart of FIG. 9 already described.

As already described with reference to FIG. 24, license key Kc and reproducing circuit control information AC2 obtained in step S132 are encrypted with public encryption key KPm(1) unique to memory card 110 without being encrypted with secret key Kcom. Therefore, step S134 is eliminated.

Subsequently to step S132, steps 136a–S148a are executed instead of steps S136–S148, respectively. Steps 136a–S148a differ from respective steps S136–S148 in that license key Kc and reproducing circuit control information AC2 are handled in the form of Kc//AC2 without encryption, and the form of {Kc//AC2}Kcom handled in steps S136–S148 is not used. The processing for encryption and decryption other than the above is substantially the same as that already described with reference to FIG. 9, and therefore, description thereof is not repeated.

Figure 29:
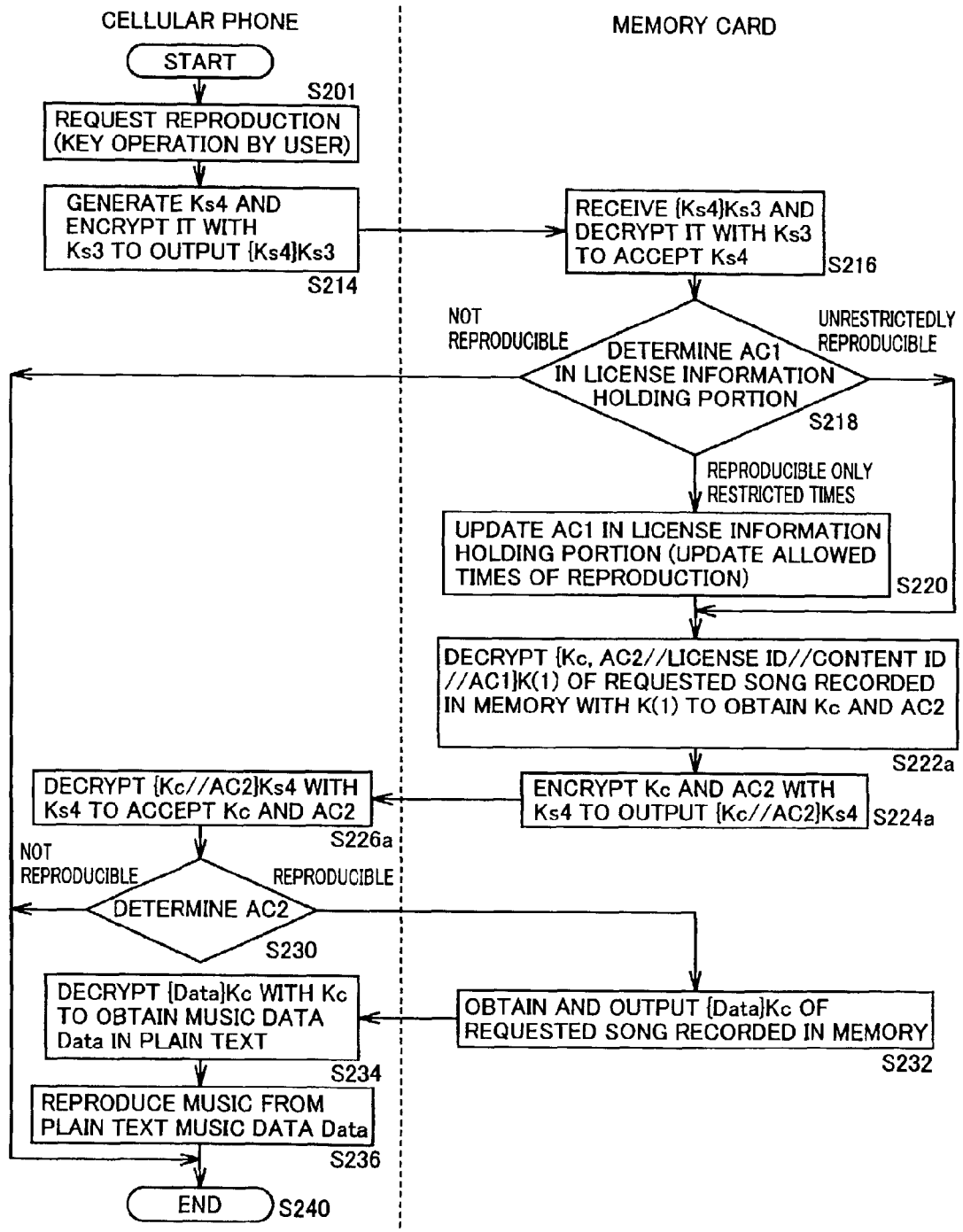
FIG. 29 is a flowchart representing operations of various portions in the reproduction session of a system using a memory card of the third embodiment.

FIG. 29 is a flowchart representing the reproduction operations in the data distribution system according to the third embodiment. In the third embodiment, it is assumed that the reproduction initialization session is performed similarly to the first embodiment.

Referring to FIG. 29, the reproduction operations in the data distribution system according to the third embodiment differs from the reproduction operations in the data distribution system according to the first embodiment shown in FIG. 6 in that steps S222a–S226a are executed instead of steps S222–S226, respectively. Steps S222a–226a differ from respective steps S222–S226 in that license key Kc and reproducing circuit control information AC2 are handled in the form of Kc//AC2, and the form of {Kc//AC2}Kcom handled in steps S222–S226 is not used. The processing for encryption and decryption other than the above is substantially the same as that already described with reference to FIG. 10, and therefore, description thereof is not repeated. Since license key Kc and reproducing circuit restriction control AC2 are not encrypted with secret key Kcom, but are encrypted with public encryption key Km(1) unique to memory card 110, step S228 is eliminated. Steps other than the above are substantially the same as those shown in FIG. 10, and therefore, description thereof is not repeated.

Figure 30:
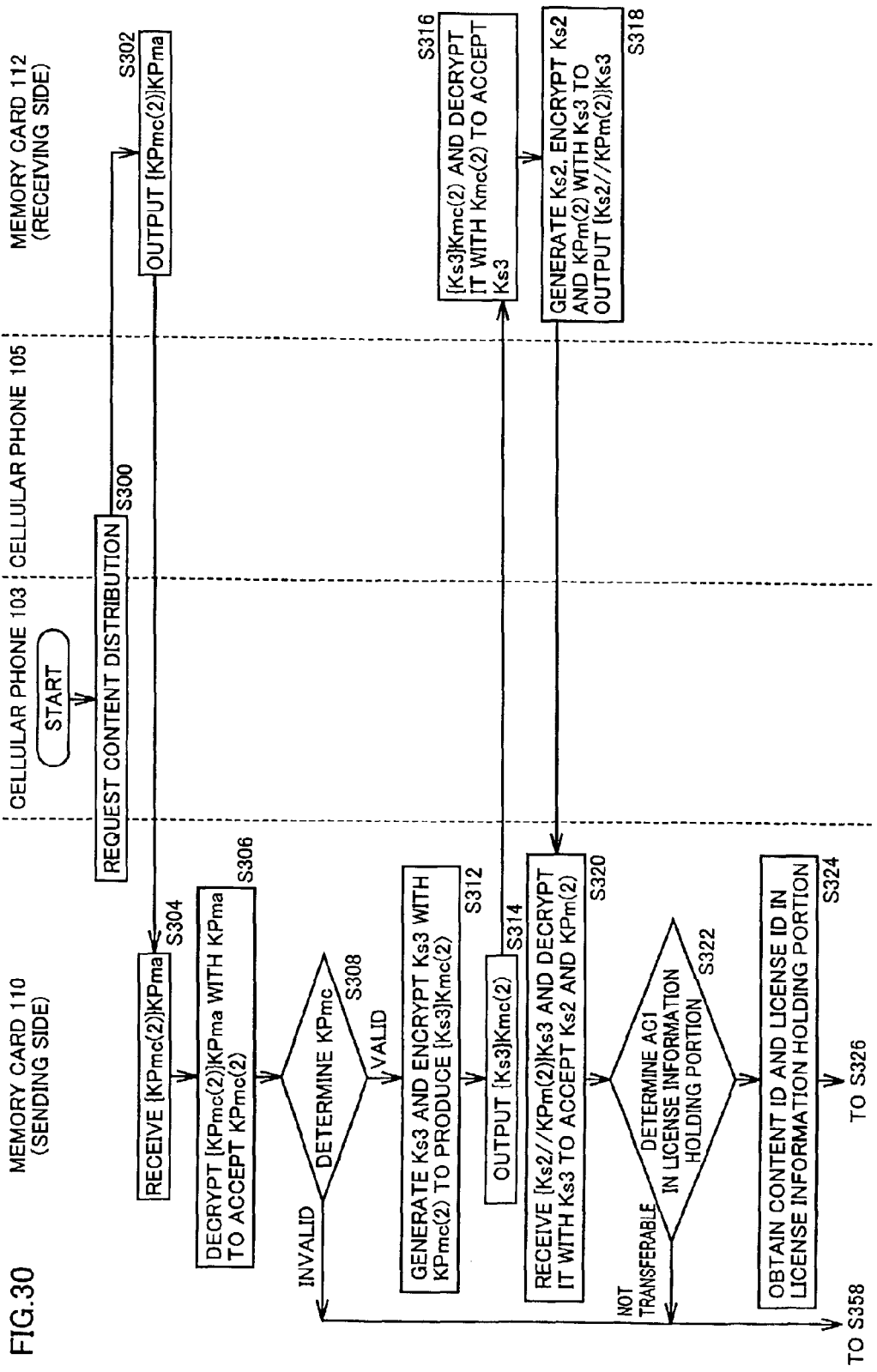
FIG. 30 is a first flowchart representing a transfer operation for transfer between two memory cards according to the third embodiment.

FIGS. 30, 31 and 32 are first, second and third flowcharts representing the transfer operation in the third embodiment, respectively.

The operations for transfer between cellular phones 103 and 105 having substantially the same structure are substantially the same as those in the first embodiment except for that license key Kc and reproducing circuit restriction information AC2 are not encrypted with secret key Kcom in the third embodiment. Thus, the operations in the third embodiment are substantially the same as those in the first embodiment except for that steps S326a–S336a are employed instead of steps S326–S336. Therefore, description thereof is not repeated.

Owing to the above structure, the data distribution system, which can achieve effects similar to those of the data distribution system according to the first embodiment, can be achieved although the system does not use secret key Kcom, which is symmetric to the content reproducing circuit (cellular phone), for performing the encryption in the license server and the decryption in the cellular phone.

Likewise, the data distribution system in the second embodiment can be configured such that the distribution server and the cellular phone do not perform the encryption and decryption using secret key Kcom symmetric to the reproducing circuit. The reproducing device may be a device other than a cellular phone, and may be formed of a structure not receiving the distribution.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data reproducing device (100) for decrypting encrypted content data to reproduce content data, comprising:

a data storing portion (110) for holding said encrypted content data and a license key for decrypting said encrypted content data, outputting said license key in an encrypted form and being removably attached to said data reproducing device;

a data reproducing portion for receiving the output of said data storing portion, and reproducing said encrypted content data; and a first control portion (1106) for controlling transmission of data between said data storing portion and said data reproducing portion, wherein said data producing portion includes:

a first decryption processing portion (1516) for receiving said license key and said encrypted content data read from said data storing portion, and decrypts said encrypted content data with said license key to extract the content data, an authentication data holding portion (1500) for holding authentication data ({KPp(1)}KPma) prepared by encrypting a public key (KPp(1)) preapplied to said data reproducing portion into a form decodable with a public authentication key (KPma) for outputting the encrypted authentication data to said data storing portion, a private key holding portion (1502) for holding a private key used for decrypting data encrypted with said preapplied public key, a second decryption processing portion (1504) for receiving a first session key (Ks3) encrypted with said public key and supplied from said data storing portion, performing decryption with said private key to extract said first session key, and holding the extracted first session key, a first session key generating portion (1508) for producing a second session key (Ks4) to be updated upon every access to said data storing portion for obtaining said license key, a first encryption processing portion (1506) for encrypting said second session key with said first session key held by said second decryption processing portion for output to said data storing portion, and, a third decryption processing portion (1510) for receiving said license key (Kc) encrypted with said second session key and supplied from said data storing portion, performing the decryption with said second session key to extract said license key, and supplying the extracted license key to said first decryption processing portion;

said data storing portion includes;

a recording portion (1415) for recording said encrypted content data and said license key, a fourth decryption processing portion (1408) for receiving said authentication data, and decrypting said authentication data with said public authentication key to extract the public key, a second control portion (1420) for performing authentication processing based on results of the decryption processing by said fourth decryption processing portion to determine whether said license key is to be output to said data reproducing portion or not, a second session key generating portion (1418) for producing and holding said second session key (Ks4) to be updated every time said second control portion determines that said license key is to be output to said data reproducing portion, a second encryption processing portion (1410) for encrypting said second session key with said public key for applying said second session key to said data reproducing portion, a fifth decryption processing portion (1412) for decrypting, with said first session key, said second session key applied from said data reproducing portion and encrypted with said first session key to extract said first session key, and a third encryption processing portion (1406) for encrypting said license key with said second session key for applying said license key to said data reproducing portion; and said first control portion performs the control to utilize said first session key common to processing of supplying the plurality of license keys to said content reproducing portion from said data storing portion corresponding to the plurality of continuous reproduction operations of the encrypted content data, to utilize, in each of said plurality of license key supply operations, said second session key different from those for the other license key supply operations, and controls said second decryption processing portion to hold said first session key during a predetermined period common to said plurality of license key supply operations.

2. The data reproducing device according to claim 1, wherein said data storing portion is a memory card removably attached to said data reproducing device.

3. The data reproducing device according to claim 1, wherein said predetermined period is a period determined within an active period of said data reproducing device and after attachment of said data storing portion to said data producing portion.

4. The data reproducing device according to claim 1, wherein said predetermined period is a period determined after said reproducing device carrying said data storing portion becomes active.

5. The data reproducing device according to claim 1, wherein said license key is recorded in said recording portion after being encrypted into a form decodable with a decryption key (Kcom) predetermined with respect to said data reproducing portion; and said third decryption processing portion has a first decryption block (1510) for decrypting, with said second session key, said license key encrypted with said decryption key and further decrypted with said second session key, and a second decryption block (1512, 1514) for receiving the output of said first decryption block, and decrypting the received output with said decryption key to extract said license key.

6. A data reproducing device (100) for storing encrypted content data and a license key for decrypting said encrypted content data, forming an encryption communication path for output of said license key, receiving said encrypted content data and said license key from a data recording device outputting said license key via said encryption communication path, and reproducing said encrypted content data, comprising:

a control portion (1106) for controlling transmission of the data between said data recording device and said data reproducing device;

a first decryption processing portion (1506) for receiving said license key and said encrypted content data read from said data recording device, and decrypting said encrypted content data with said license key to extract the content data;

an authentication data holding portion (1500) for holding authentication data ({KPp(1)}KPma) prepared by encrypting a public key (KPp(1)) preapplied to said data reproducing portion into a form decodable with a public authentication key (KPma) for outputting the encrypted authentication data to said data recording device;

a private key holding portion (1502) for holding a private key (Kp) used for decrypting data encrypted with said preapplied public key;

a second decryption processing portion (1504) for receiving a first session key (Ks3) updated upon every input of said authentication data, encrypted with said public key and supplied from said data recording device, performing decryption with said private key to extract said first session key, and holding the extracted first session key;

a first session key generating portion (1508) for producing a second session key (Ks4) to be updated upon every access to said data storing portion for obtaining said license key;

a first encryption processing portion (1506) for encrypting said second session key with said first session key held by said second decryption processing portion for output to said data recording device; and a third decryption processing portion (1510) for receiving said license key (Kc) encrypted with said second session key and supplied from said data storing portion, performing the decryption with said second session key to extract said license key, and supplying the extracted license key to said first decryption processing portion, wherein said control portion performs the control to utilize said first session key common to processing of supplying the plurality of license keys to said content reproducing portion from said data storing portion corresponding to the plurality of continuous reproduction operations of the encrypted content data, to utilize, in each of said plurality of license key supply operations, said second session key different from those for the other license key supply operations, and controls said second decryption processing portion to hold said first session key during a predetermined period common to said plurality of license key supply operations.

7. The data reproducing device according to claim 6, wherein said license key is recorded in said data recording device after being encrypted into a form decodable with a decryption key (Kcom) predetermined with respect to said data reproducing device; and said third decryption processing portion has a first decryption block (1510) for decrypting, with said second session key, said license key encrypted with said decryption key and further decrypted with said second session key, and a second decryption block (1512, 1514) for receiving the output of said first decryption block, and decrypting the received output with said decryption key to extract said license key.

8. The data reproducing device according to claim 6, wherein said predetermined period is a period determined within an active period of said data reproducing device and after attachment of said data storing portion to said data producing portion.

9. The data reproducing device according to claim 6, wherein said predetermined period is a period determined after said reproducing device carrying said data storing portion becomes active.

* * * * *

UNITED STATES PATENT AND TRADEMARK OFFICE
CERTIFICATE OF CORRECTION

PATENT NO. : 6,898,708 B2  Page 1 of 1
DATED : May 24, 2005
INVENTOR(S) : Hori et al.

It is certified that error appears in the above-identified patent and that said Letters Patent is hereby corrected as shown below:

Title page,
Item [56], References Cited, OTHER PUBLICATIONS, insert:
-- "intel and RSA to accelerate delivery of new PC and application security products", M2 Presswire, (Jan. 18, 1999).*
K. Yamanaka et al.; NTT R&D, vol. 44, No. 9, pp.813-818, 1995. See PCT search report.
S. Kotani et al.; vol 49, No. 3, May 1998. See PCT search report.
Partial translation of Ango Riron Nyumon.
Partial translation of Nikkei Electronics 1999.3.2, No. 739 --.

Signed and Sealed this

Twenty-first Day of March, 2006

JON W. DUDAS
*Director of the United States Patent and Trademark Office*